US010301041B2

(12) United States Patent
Shao et al.

(10) Patent No.: US 10,301,041 B2
(45) Date of Patent: May 28, 2019

(54) SYSTEMS AND METHODS FOR TRACKING MOVING OBJECTS

(71) Applicant: California Institute of Technology, Pasadena, CA (US)

(72) Inventors: Michael Shao, Pasadena, CA (US); Shanti R. Rao, Altadena, CA (US); Bijan Nemati, Madison, AL (US); Navtej Singh Saini, Pasadena, CA (US); Russell Edward Trahan, III, Los Angeles, CA (US); Thomas A. Werne, Pasadena, CA (US); Chengxing Zhai, La Canada Flintridge, CA (US)

(73) Assignee: California Institute of Technology, Pasadena, CA (US)

( * ) Notice: Subject to any disclaimer, the term of this patent is extended or adjusted under 35 U.S.C. 154(b) by 103 days.

(21) Appl. No.: 15/619,260

(22) Filed: Jun. 9, 2017

(65) Prior Publication Data

US 2017/0358103 A1   Dec. 14, 2017

Related U.S. Application Data

(60) Provisional application No. 62/347,979, filed on Jun. 9, 2016.

(51) Int. Cl.
*H04N 5/232* (2006.01)
*B64D 47/08* (2006.01)
(Continued)

(52) U.S. Cl.
CPC ............ *B64D 47/08* (2013.01); *B64C 39/024* (2013.01); *G01S 3/00* (2013.01); *G06T 7/254* (2017.01);
(Continued)

(58) Field of Classification Search
CPC . B64C 2201/127; B64C 39/024; B64D 47/08; G01S 3/00; G06T 2207/10016;
(Continued)

(56) References Cited

U.S. PATENT DOCUMENTS

2013/0336581 A1*  12/2013  Datta .................. G06K 9/00785
                                                       382/165
2016/0131882 A1    5/2016  Lindensmith et al.
(Continued)

OTHER PUBLICATIONS

Green et al., "Super-resolution of atmospheric degraded imagery", Part of the SPIE Conference on Propagation and Imaging through the Atmosphere III, Denver, Colorado, Jul. 1999, pp. 94-101.
(Continued)

*Primary Examiner* — Siamak Harandi
(74) *Attorney, Agent, or Firm* — KPPB LLP

(57) ABSTRACT

Systems and methods for tracking moving objects in accordance with embodiments of the invention are disclosed. In one embodiment of the invention, an object tracking system comprises a processor, a communications interface, and a memory configured to store an object tracking application. The object tracking application configures the processor to receive a sequence of images; estimate and subtract background pixel values from pixels in a sequence of images; compute sets of summed intensity values for different per frame pixel offsets from a sequence of images; identify summed intensity values from a set of summed intensity values exceeding a threshold; cluster identified summed intensity values exceeding the threshold corresponding to single moving objects; and identify a location of at least one moving object in an image based on at least one summed intensity value cluster.

33 Claims, 25 Drawing Sheets

(51) Int. Cl.
*G06T 7/254* (2017.01)
*B64C 39/02* (2006.01)
*G01S 3/00* (2006.01)

(52) U.S. Cl.
CPC ..... *H04N 5/23238* (2013.01); *H04N 5/23254* (2013.01); *H04N 5/23277* (2013.01); *B64C 2201/127* (2013.01); *B64D 2205/00* (2013.01); *G06T 2207/10016* (2013.01); *Y02T 50/823* (2013.01)

(58) Field of Classification Search
CPC ................ G06T 7/254; H04N 5/23238; H04N 5/23254; H04N 5/23277
See application file for complete search history.

(56) References Cited

U.S. PATENT DOCUMENTS

2017/0177937 A1  6/2017  Harmsen et al.
2017/0178352 A1  6/2017  Harmsen et al.

OTHER PUBLICATIONS

Priedhorsky et al., "Optical Detection of Rapidly Moving Objects in Space", Applied Optics, vol. 44, No. 3, Jan. 20, 2005, pp. 423-433.
Shao et al., "Finding Very Small Near-Earth Asteroids Using Synthetic Tracking", The Astrophysical Journal, 782:1, 10 pgs, Jan. 17, 2014.
Shao et al., "A constellation of SmallSats with synthetic tracking cameras to search for 90% of potentially hazardous near-Earth objects", Astronomy & Astrophysics manuscript, Apr. 17, 2017, 14 pgs, Version 2, Retrieved from: https://arxiv.org/pdf/1503.07944.pdf.
Shao et al., "A constellation of SmallSats with synthetic tracking cameras to search for 90% of potentially hazardous near-Earth objects", Mar. 27, 2015, 34 pgs, Version 1, Retrieved from: https://arxiv.org/pdf/1503.07944v1.pdf.
Zhai et al., "Detection of a Faint Fast-Moving Near-Earth Asteroid Using the Synthetic Tracking Technique", The Astrophysical Journal, 792:60, 14 pgs, Aug. 14, 2014.

* cited by examiner

SYSTEMS AND METHODS FOR TRACKING MOVING OBJECTS

CROSS-REFERENCE TO RELATED APPLICATION(S)

The current application claims priority to U.S. Provisional Patent Application Ser. No. 62/347,979 entitled "Advanced Tracking Camera to Detect Aerial Vehicles Through Synthetic Tracking," filed Jun. 9, 2016, the disclosure of which is herein incorporated by reference in its entirety.

STATEMENT OF FEDERALLY SPONSORED RESEARCH

The invention described herein was made in the performance of work under a NASA contract NNN12AA01C, and is subject to the provisions of Public Law 96-517 (35 USC 202) in which the Contractor has elected to retain title.

FIELD OF THE INVENTION

This invention generally relates to the tracking of moving objects. More particularly, this invention relates to the detection and evaluation of moving objects that are not readily visible.

BACKGROUND

Object tracking, or video tracking, is the process of locating and monitoring an object that is moving using images captured by a camera. This form of tracking can be used in a variety of fields, including entertainment, security, communications, augmented reality, law enforcement, military defense, medicine and other scientific endeavors. The object tracking process can be time consuming given the large amounts of data inherent in video capture. Object tracking aims to relate objects between consecutive frames of a video. Various algorithms may be used to analyze video frames for the object's movement between frames. Two basic parts of object tracking include detecting the object and associating detections of the same object over time. Challenges can arise in the case of objects that are fast-moving or change orientation. To handle these situations, motion models may be employed to describe potential changes in the object's appearance or trajectory.

Various object recognition techniques may be employed in the context of object tracking to locate and identify objects in an image sequence, using computer vision. Object recognition seeks to mimic the human ability to easily recognize objects despite variables such as different viewpoints, sizes, rotations, and partial obstruction. Many approaches have been presented, including appearance-based methods and feature-based methods. Appearance-based methods use exemplars, or template images, of an object to represent a multitude of appearances of the object and perform recognition accordingly. The exemplars may represent the object under varying conditions such as lighting, viewing direction, size and shape. Feature-based methods aim to match target object features with image features, such as surface patches, corners and/or linear edges.

SUMMARY OF THE INVENTION

Systems and methods for tracking moving objects in accordance with various embodiments of the invention are disclosed.

In one embodiment of the invention, an object tracking system comprises a processor, a communications interface capable of transmitting a sequence of images to the processor, and a memory coupled with the processor and configured to store an object tracking application. Execution of the object tracking application directs the processor to receive a sequence of images, wherein at least one moving object is visible in relation to a background in the sequence of images; estimate pixel background values based on an average of pixel values within a sequence of images; subtract background pixel values from pixels in a sequence of images; compute sets of summed intensity values for different per frame pixel offsets from a sequence of images, wherein a summed intensity value for a given per frame pixel offset is computed by summing intensity values of pixels in the images from the sequence of images determined using the given per frame pixel offset relative to a pixel location in a reference image from the sequence of images; identify summed intensity values from a set of summed intensity values exceeding a threshold; cluster identified summed intensity values exceeding the threshold corresponding to single moving objects; and identify a location of at least one moving object in an image based on at least one summed intensity value cluster.

In a further embodiment, the object tracking system further comprises a camera in communication with the processor.

In another embodiment, the object tracking system further comprises a plurality of cameras in communication with the processor.

In a yet further embodiment, execution of the object tracking application further directs the processor to perform image stabilization on a sequence of images.

In another embodiment, the image stabilization is performed by calculating a Fourier transform for each image in the sequence of images in the frequency domain; and multiplying each of the Fourier transforms by a linear phase function, wherein the slope of the linear phase function specifies a fractional pixel shift.

In yet another embodiment, the image stabilization is further performed by inverse transforming each of the Fourier transforms back to the spatial domain.

In a further embodiment, the given per frame pixel offset is determined based on the fractional pixel shift and a velocity shift.

In still another embodiment, the image stabilization is performed by identifying at least one camera movement direction based on a set of adjacent frames of the sequence of images; and degrading the resolution of each frame of the set of adjacent frames based on the at least one camera movement direction.

In a still further embodiment, summing intensity values of pixels from the sequence of images determined using the given per frame pixel offset relative to a pixel location in the reference image is performed by creating background-subtracted pixels; and summing intensity values of the background-subtracted pixels from the sequence of images determined using the given per frame pixel offset relative to a pixel location in the reference image.

In still another embodiment, summing intensity values of pixels from the sequence of images determined using the given per frame pixel offset relative to a pixel location in the reference image is performed by summing the intensity values of the pixels for the given per frame pixel offset; and subtracting the background pixel values for the summed pixels from the sum of the intensity values of the pixels.

In a yet further embodiment, execution of the object tracking application further directs the processor to determine at least one peak in the at least one summed intensity value exceeding a threshold; detect a position of the at least one moving object based on the at least one peak; and report the position of the at least one moving object to a display device in real time.

In yet another embodiment, the at least one peak includes a plurality of peaks; and execution of the object tracking application further directs the processor to determine a per frame sub-pixel offset based on the pixel offsets associated with the plurality of peaks; compute a summed intensity value for the per frame sub-pixel offset by interpolating a plurality of intensity values for the per frame sub-pixel offset, the plurality of interpolated intensity values including an interpolated intensity value for a plurality of images in the sequence of images; and summing at least the plurality of interpolated intensity values to generate the summed intensity value. Execution of the object tracking application further directs the processor to estimate a velocity of the at least one moving object based on the per frame sub-pixel offset associated with the summed intensity value; and report the velocity of the at least one moving object to a display device in real time.

In a further embodiment again, clustering identified summed intensity values exceeding the threshold corresponding to single moving objects is performed by calculating a distance between a first summed intensity value and a second summed intensity value in four-dimensional space, the first and second summed intensity values being from identified summed intensity values exceeding the threshold; determining whether the first and second summed intensity values are neighbors based on the calculated distance; and when the first and second summed intensity values are determined to be neighbors, combining the first and second summed intensity values into a summed intensity value cluster.

In another embodiment again, execution of the object tracking application further directs the processor to display the location of the at least one moving object in an image from a received sequence of images in real time.

In yet another embodiment again, execution of the object tracking application further directs the processor to classify the at least one moving object into an object category.

In still another embodiment, execution of the object tracking application further directs the processor to generate an alert based on classification of the at least one moving object into an object category.

In still yet another embodiment, execution of the object tracking application further directs the processor to generate a thumbnail of at least one moving object; and report a thumbnail of at least one moving object via a display device in real time.

In a further embodiment, the at least one moving object includes an article from the group consisting of an asteroid and an unmanned aerial vehicle (UAV).

An object tracking method, according to another further embodiment of the invention, comprises receiving a sequence of images, wherein at least one moving object is visible in relation to a background in the sequence of images; estimating pixel background values based on an average of pixel values within the sequence of images; subtracting the background pixel values from pixels in the sequence of images to create background-subtracted pixels; computing sets of summed intensity values for different per frame pixel offsets from the background-subtracted pixels, wherein a summed intensity value for a given per frame pixel offset is computed by summing intensity values of background-subtracted pixels from the sequence of images determined using the given per frame pixel offset relative to a pixel location in a reference image from the sequence of images; identifying summed intensity values from the sets of summed intensity values exceeding a threshold; clustering the identified summed intensity values exceeding the threshold corresponding to single moving objects to form at least one summed intensity value cluster; and identifying a location of at least one moving object in an image based on the at least one summed intensity value cluster.

In still another further embodiment of the invention, the object tracking method further comprises performing image stabilization on the sequence of images.

In a still yet further embodiment, the image stabilization is performed by calculating a Fourier transform for each image in the sequence of images in the frequency domain; and multiplying each of the Fourier transforms by a linear phase function, wherein the slope of the linear phase function specifies a fractional pixel shift.

In still yet another embodiment of the invention, the image stabilization is further performed by inverse transforming each of the Fourier transforms back to the spatial domain.

In a still further embodiment again, the given per frame pixel offset is determined based on the fractional pixel shift and a velocity shift.

In still another embodiment again, the image stabilization is performed by identifying at least one camera movement direction based on a set of adjacent frames of the sequence of images; and degrading the resolution of each frame of the set of adjacent frames based on the at least one camera movement direction.

In a yet further embodiment, the object tracking method further comprises determining at least one peak in the at least one summed intensity value exceeding a threshold; detecting a position of the at least one moving object based on the at least one peak; and reporting the position of the at least one moving object to a display device in real time.

In another further embodiment, the at least one peak includes a plurality of peaks; and the object tracking method further comprises determining a per frame sub-pixel offset based on the pixel offsets associated with the plurality of peaks; computing a summed intensity value for the per frame sub-pixel offset by interpolating a plurality of intensity values for the per frame sub-pixel offset, the plurality of interpolated intensity values including an interpolated intensity value for a plurality of images in the sequence of images; and summing at least the plurality of interpolated intensity values to generate the summed intensity value. The object tracking method further comprises estimating a velocity of the at least one moving object based on the per frame sub-pixel offset associated with the summed intensity value; and reporting the velocity of the at least one moving object to a display device in real time.

In still another embodiment, clustering identified summed intensity values exceeding the threshold corresponding to single moving objects is performed by calculating a distance between a first summed intensity value and a second summed intensity value in four-dimensional space, the first and second summed intensity values being from identified summed intensity values exceeding the threshold; determining whether the first and second summed intensity values are neighbors based on the calculated distance; and when the first and second summed intensity values are determined to be neighbors, combining the first and second summed intensity values into a summed intensity value cluster.

In still yet another embodiment, the object tracking method further comprise displaying the location of the at least one moving object in an image from a received sequence of images in real time.

In still another embodiment, the object tracking method further comprises classifying the at least one moving object into an object category.

In a further embodiment, the object tracking method further comprises generating an alert based on the classification of the at least one moving object into the object category.

In another further embodiment, the object tracking method further comprises generating a thumbnail of the at least one moving object; and reporting the thumbnail of the at least one moving object to a display device in real time.

In yet another further embodiment, the at least one moving object includes an article from the group consisting of an asteroid and an unmanned aerial vehicle (UAV).

An object tracking system, in yet another embodiment of the invention, comprises a processor, a communications interface capable of transmitting a sequence of images to the processor; and a memory coupled with the processor and configured to store an object tracking application, wherein execution of the object tracking application directs the processor to receive a sequence of images, wherein at least one moving object is visible in relation to a background in the sequence of images; perform image stabilization relative to a reference image in the sequence of images; estimate pixel background values based on an average of pixel values within the image stabilized sequence of images; subtract the background pixel values from pixels in the image stabilized sequence of images to create background-subtracted pixels; compute sets of summed intensity values for different per frame pixel offsets from the background-subtracted pixels, wherein a summed intensity value for a given per frame pixel offset is computed by summing intensity values of the background-subtracted pixels from the image stabilized sequence of images determined using the given per frame pixel offset relative to a pixel location in the reference image; identify summed intensity values from the sets of summed intensity values exceeding a threshold; cluster the identified summed intensity values exceeding the threshold corresponding to single moving objects to form at least one summed intensity value cluster; and identify a location of at least one moving object in the reference image based on the at least one summed intensity value cluster.

BRIEF DESCRIPTION OF THE DRAWINGS

FIG. 20 shows a color image of a scene.

FIG. 21 shows the red component of the image of FIG. 20.

FIG. 22 shows the image of FIG. 21 with background clutter removed.

FIG. 23 shows the image of FIG. 21 with application of an object tracking method in accordance with an embodiment of the invention.

FIG. 24 shows the image of FIG. 21 with application of an object tracking method in accordance with another embodiment of the invention.

DETAILED DESCRIPTION

Figure 1:
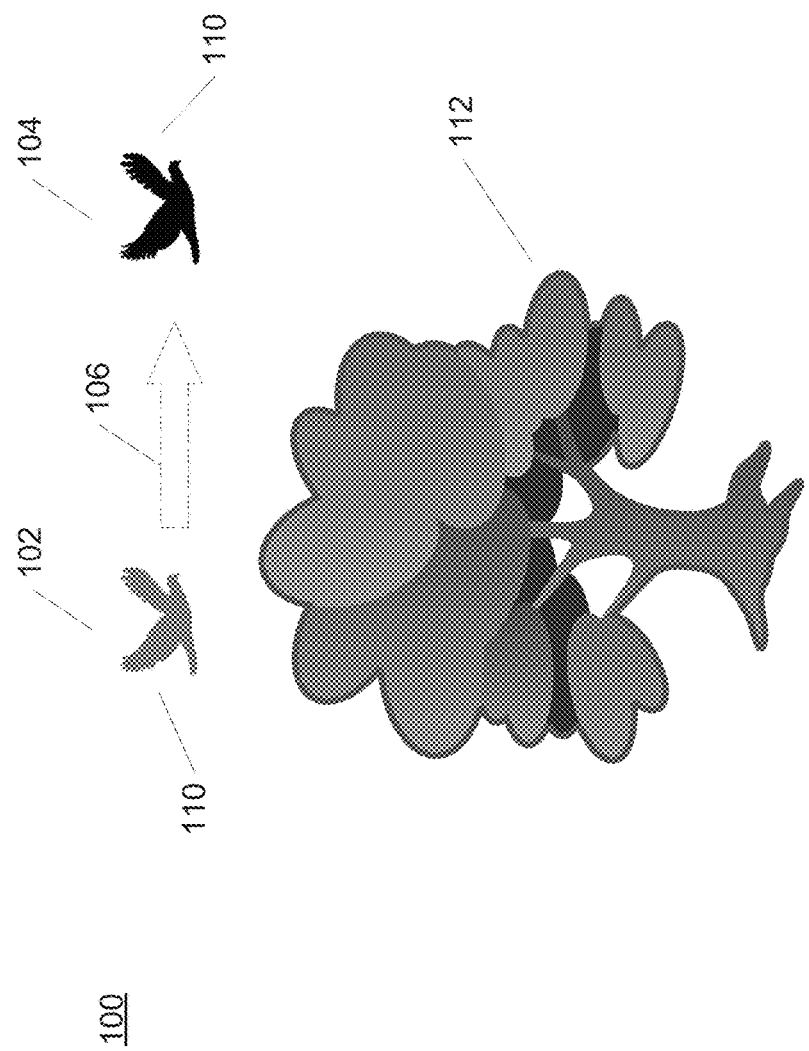
FIG. 1 is a conceptual illustration of a scene including an object moving relative to a background.

Turning now to the drawings, systems and methods for tracking of moving objects are illustrated. In many embodiments of the invention, the moving object may not be readily visible to the naked eye, nor detectable with the assistance of a telescope, binoculars, microscope or other viewing device. The tracked object may be any of a plethora of moving objects, including but not limited to unmanned aerial vehicles (UAVs, commonly known as drones), asteroids, aircraft, microscopic bodies of interest, and various other traveling articles.

An example of a context in which tracking a moving object may be important is that of managing threats posed by UAVs. A non-friendly UAV that is moving toward a destination may not be readily visible from a remote distance either to the naked eye or via binoculars, cameras and other viewing devices. Once visible, the UAV may already be too close to the destination for an effective defensive response. Certain embodiments of the invention may provide a means for detecting and monitoring such a UAV remotely, such that adequate time is provided for a response. It may be readily appreciated that various other uses exist for many embodiments of the invention, such as but not limited to redirection of commercial UAVs and aircraft safety, the identification of bacteria in a wide-field microscope, and/or the tracking of any other objects having motion that causes the image of the target to cross pixel boundaries relative to a background.

An object at a distance, such as but not limited to a UAV of <40 cm diameter at a distance of >2 km, may appear dim, and thus may require a long exposure to be captured in an image. If the object is also moving, it will appear blurry in a long-exposure shot, and its position can be difficult to ascertain. Attempting to capture the object using a short exposure, however, typically results in the object appearing too faint for positive identification. In addition, faint or blurry objects can be difficult to classify as, for example, a UAV as differentiated from a bird.

According to several embodiments of the invention, an object tracking system applies a shift-and-add process to a sequence of short high-frame rate exposures of a scene, to synthetically render a long-exposure image of a moving object within the scene. Clustering processes can be utilized to determine the number of moving objects that are present based upon the content of the synthetically rendered long-exposure images. In many instances, a single moving object can appear as multiple high intensity pixels within such a synthetically rendered long-exposure image and a clustering process can be utilized to refine the location and/or velocity of the moving object. In many embodiments of the invention, the object tracking process is performed efficiently using processes that can be parallelized on processors such as (but not limited to) Graphics Processing Units (GPUs). In this way, user interfaces and/or alerts identifying one or more moving objects can be generated and presented to one or more users in real time.

The detection, monitoring and reporting of small moving objects may have various scientific, medical, commercial, educational and military uses. Although specific examples are discussed above and throughout the present specification, it can be readily appreciated that real-time object tracking according to various embodiments of the invention may be implemented in many different fields, and are not limited to those particular examples discussed herein.

Object Tracking Systems

According to a number of embodiments of the invention, an object moving in relation to a background is identified and tracked by an object tracking system. As an example, FIG. 1 illustrates a scene 100 with a bird or moving object 110 moving from position 102 to 104, relative to a stationary tree or background 112. This shows a simple example of a moving object 110 moving relative to a background 112. The object's path 106, although illustrated with a straight arrow, may be of one or more straight or curved trajectories. The moving object 110 is shown against a light background, but may also be flying in front of a lower-contrast background 112 such as the tree.

For purposes of this patent application, the scene 100, moving object 110 and background 112 as illustrated in FIG. 1 merely exemplify scenes with moving objects and backgrounds in general, and mentions of these figure elements throughout the specification are not intended to limit the context or type of scene, object or background in any way. Thus, scene 100 can be contemplated to include, but are not limited to, outdoor or indoor backgrounds, and/or any of a variety of moving objects ranging from flying objects to microscopic cells.

Figure 2:
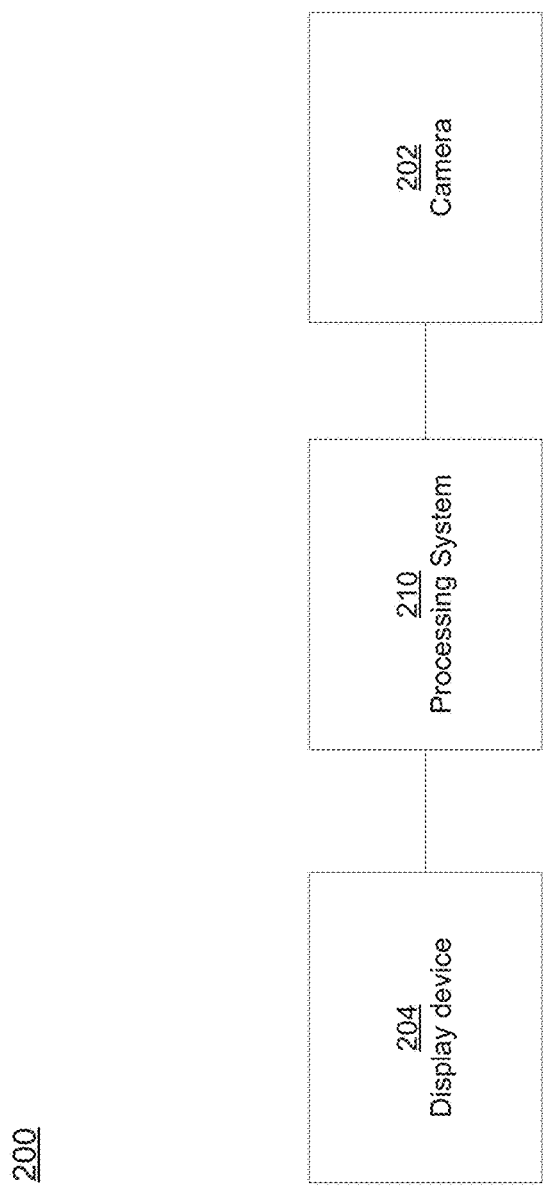
FIG. 2 is a diagram of an object tracking system in accordance with an embodiment of the invention.
Figure 3:
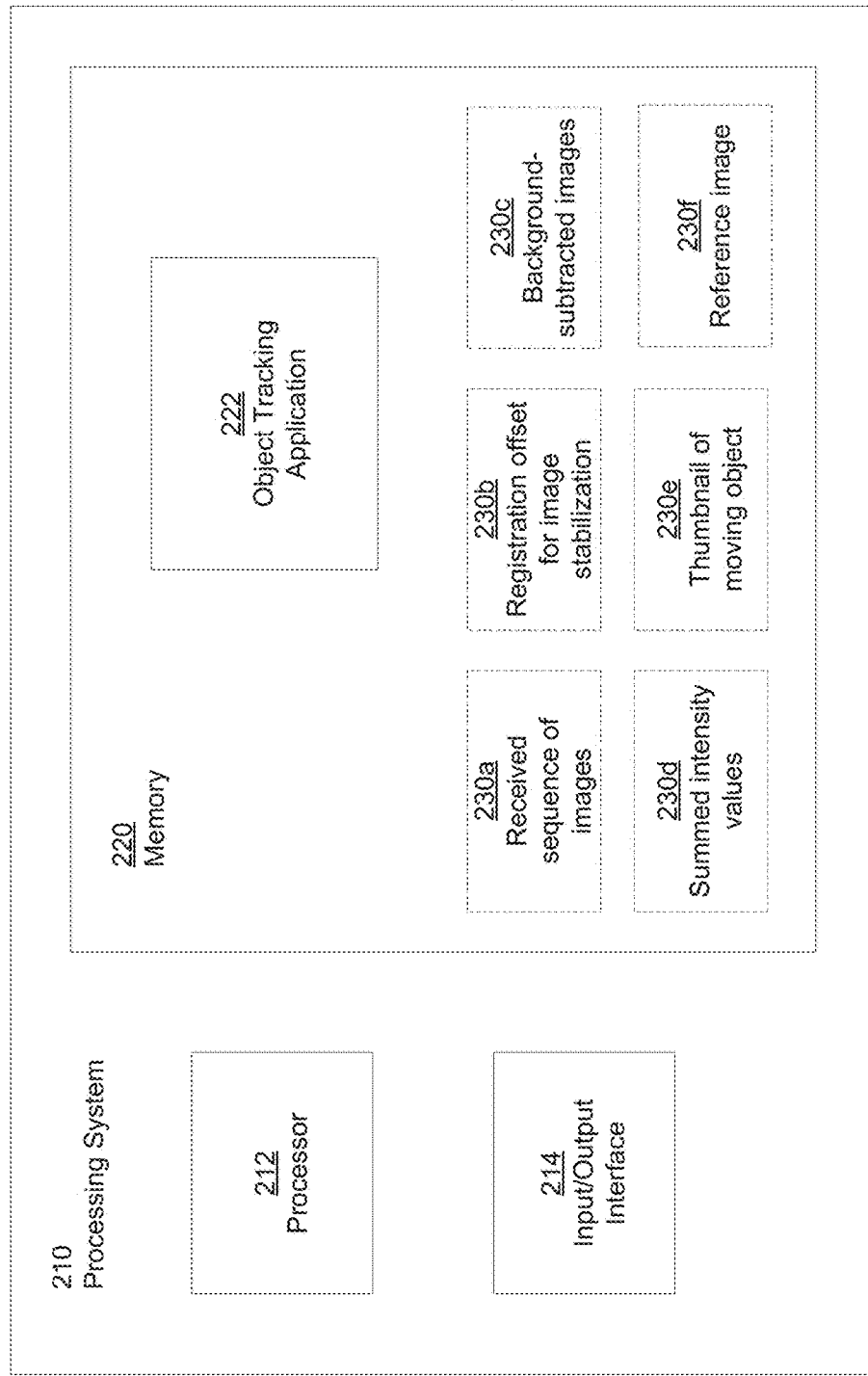
FIG. 3 is a diagram of a processing system utilized within in an object tracking system in accordance with an embodiment of the invention.

According to a number of embodiments of the invention, an object tracking system 200 such as that illustrated in FIG. 2 receives a sequence of images at processing system 210. The images may include consecutive exposures of a scene 100. The processing system 210 may receive the images via its input/output or communications interface 214, as shown in FIG. 3. These images may be captured and transmitted by camera 202. Camera 202 may be connected directly to processing system 210 as shown in FIG. 2, or may remotely and/or indirectly transmit its data to processing system 210 via one of various wired or wireless means. Camera 202 can be one of various types of cameras, including but not limited to monochrome, RGB, near-IR, and/or arrays of cameras. According to many embodiments of the invention, camera 202 can capture high-frame rate exposures of a scene, and may employ one of various types of sensors, such as but not limited to modern scientific CMOS (sCMOS) sensors. In certain embodiments of the invention, a built-in noise reduction feature is disabled in camera 202, so as to preserve the data in as raw a state as possible for analysis. In many embodiments, imaging parameters are controlled to remain fixed during capture of a sequence of images. According to some embodiments of the invention, camera 202 is a color camera, and object tracking methods can be applied to individual color channels, or to a weighted sum of the different color channels. This may assist in retaining maximum pixel information and/or in increasing contrast relative to the background. In many embodiments of the invention, the sequence of images received by processing system 210 includes high-frame rate images of scene 100. The images may be short-exposure shots, resulting in the moving object 110 appearing frozen at various points in its path 106.

As an example if the camera is running at 30 frames/sec, each frame could be exposed for up to 33 msec, less some time for reading out the pixel. If the pixels are saturated, then information about the subthreshold target could get lost. In that case, the exposure time could be decreased until the part of the image, in which a target is expected to be seen, is no longer saturated. Some CMOS sensors can go down to exposures of a few microseconds, and then wait for 33 msec until it is time to capture the next image. This may also be implemented to reduce motion blur, especially if the camera is on a moving vehicle. As an example, short exposures may be employed when the camera has substantial light-gathering power and the exposure time is reduced to prevent the brightness of the background from driving pixels beyond their linear response regime or to saturation, in which case no motion signal would be observable.

Figure 5:
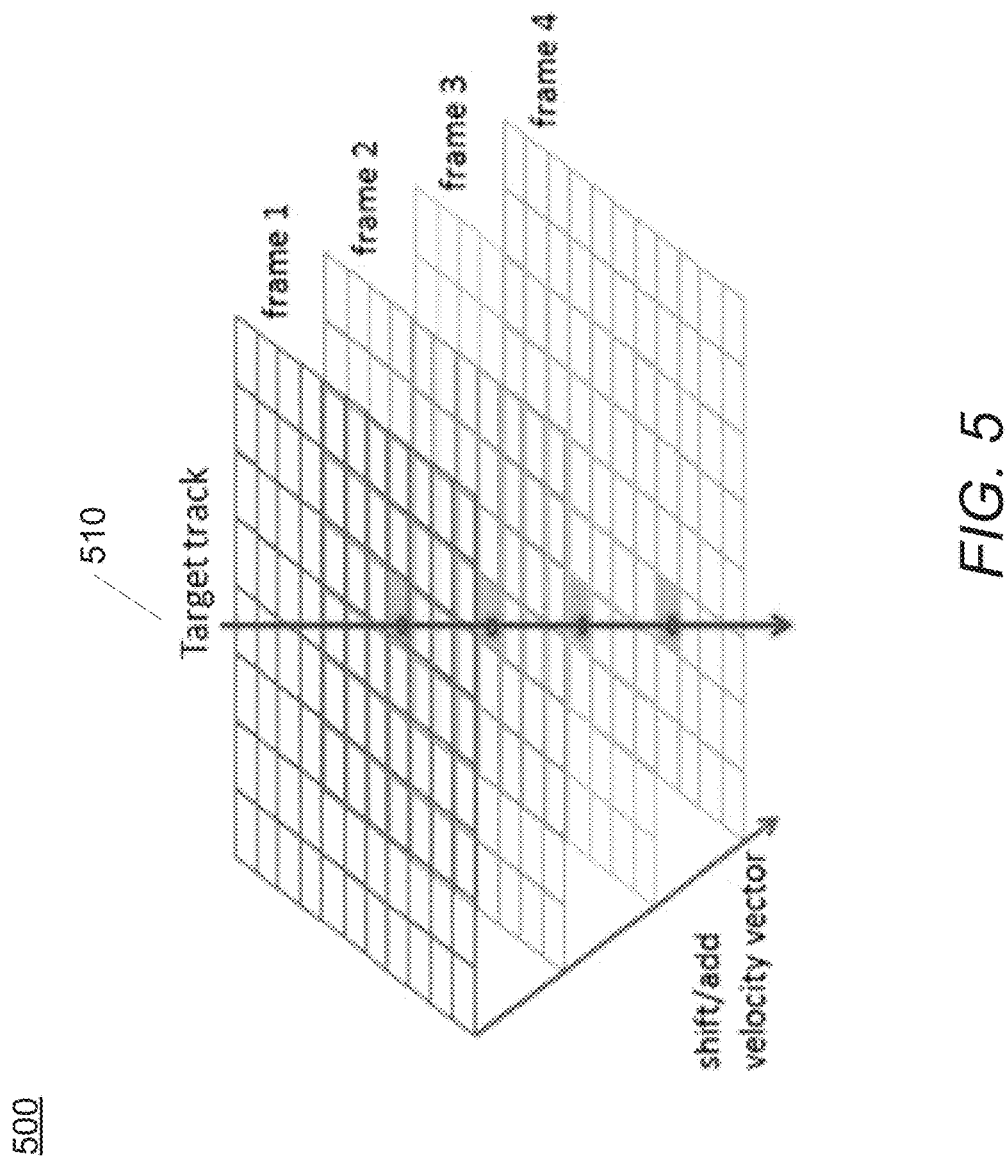
FIG. 5 is a diagram showing a shift-and-add of multiple image frames according to an embodiment of the invention.

Although the moving object 110 may appear faint or undetectable within a single frame, according to a number of embodiments of the invention, processing system 210 performs an object tracking process that can include a series of shift-and-add computations. These shift-and-add computations can be conceptually viewed as a processing in which the images within the sequence are shifted so that the moving object 110 within one image is matched up with the position of the moving object 110 within other images. Upon summing the pixels of the shifted images, the moving object 110 may appear more prominently in this synthetically rendered long-exposure image. A conceptual illustration of such shifted and added frames 500, with the object lined up at target track 510, is shown in FIG. 5. Object tracking methods are discussed further in the sections below.

As can readily be appreciated, the location of moving objects in the images is not known a priori. Accordingly, the shift-and-add computations involve adopting a hypothesis that a given pixel within a frame images an object that is moving, and summing pixels across a sequence of preceding images corresponding to locations that would be occupied assuming that the object is moving at a given velocity. Each possible velocity (i.e. speed and direction) involves the generation of a different sum of pixel locations across the sequence of images. The specific pixels that are summed can be determined based upon shifts in pixel locations between successive frames in the sequence corresponding to a specific pixel per frame interval velocity. In practice, the shifts and sum process can result in a single object causing a number of pixel sums corresponding to different velocities. The pixel sum with the highest intensity can provide the best estimate of the true location and velocity of an object. In many embodiments, clustering processes can be utilized to determine the number of moving objects that are present based upon the observed pixel sums. In several embodiments, moving objects and their velocities are detected using sums of corresponding pixel locations in the sequence of images at specific velocities that result in values that exceed a predetermined threshold. When background subtraction is applied during the summing process, the correct velocity will yield a sum in which a high contrast pixel value is reinforced. The sums of incorrect velocity hypotheses will include many pixels having a background subtracted intensity (i.e. pixels that do not image the moving object) and so will result in a sum that is lower and less likely to exceed the threshold. When the sums generated for a given pixel location do not exceed the threshold at any hypothetical velocity, the processing system 210 can determine that the pixel location does not image a moving object. As can readily be appreciated, the ability to process individual pixel locations independently creates significant opportunities to accelerate the shift-and-add computations through parallelization. Accordingly, processing system 210 in accordance with a number of embodiments utilizes the parallel processing capabilities of devices including (but not limited to) GPUs and/or machine vision processors to perform shift-and-add computations during tracking processes.

Once the processing system 210 has detected and determined information regarding at least one moving object, it can transmit information about the moving object via its input/output interface 214 to another device, such as but not limited to a display device 204. Display device 204 may be connected directly to processing system 210 as shown in FIG. 2, or may remotely and/or indirectly receive data from processing system 210 via one of various wired or wireless means. Display device 204 may include a portable computing device such as but not limited to a tablet, mobile phone, augmented reality visor or heads-up display that includes a client application configured to communicate with a remote server, or it may receive an email alert or other type of message with an image showing the moving object 110.

Processing system 210 may be implemented on a single computing device in accordance with some embodiments of the invention, such as that illustrated in FIG. 3. Processing system 210 may be a personal computer, a laptop computer, a cloud processing resource, an embedded computing platform and/or any other computing device with sufficient processing power for the processes described herein. Processing system 210 may perform processing locally, or it may partially compute information locally, with additional processing being performed on a set of GPUs that could be located locally or remotely. Processing system 210 includes a processor 212, which may refer to one or more devices within the computing device that can be configured to perform computations via machine readable instructions stored within a memory 220 of the processing system 210. The memory 220 may contain an object tracking application 222 that performs processes such as those described above. The memory 220 may also store various types of data, simultaneously or in succession, such as but not limited to a received sequence of images 230a, registration offsets for image stabilization 230b, background-subtracted image data 230c, summed intensity values 230d, a thumbnail of a moving object 230e, and/or a reference image 230f.

The processor 212 may include one or more microprocessors (CPUs), one or more graphics processing units (GPUs), and/or one or more digital signal processors (DSPs). According to other embodiments of the invention, the processing system 210 may be a system implemented on multiple computers. In some embodiments of the invention, processing system 210 may include an input/output interface 214 that can be utilized to communicate with a variety of devices, including but not limited to a camera 202 and/or display device 204. As can be readily appreciated, a variety of software architectures can be utilized to implement a computer system 210 in accordance with several embodiments of the invention. According to many embodiments of the invention, object tracking systems may compute and report object information in real time using a graphics processing unit (GPU) and/or parallel processors, thus providing information about the moving object efficiently and allowing sufficient time for a relevant response. As an example, processes performed by object tracking systems may be parallelized by segmenting the image space and/or the velocity search space across multiple processors. The velocity search space, being smaller than the image raster, can be folded into a single dimension for segmentation by a GPU. One of various ways may be used to cache parts of the image and background for optimal processing by a processor. Further, many modern GPUs are particularly effective in performing image processing tasks. As an example, a 4K Ultra HD camera may produce approximately 1 GB of image data per second. A UAV-detecting vehicle may employ several such cameras, potentially producing a combined terabyte of data approximately every two minutes. Transmission of such amounts of data from a camera, while inefficient to a remote computer, may be practicable in real time to one or more locally or closely connected GPUs.

While object tracking systems are described above with respect to FIGS. 1-3 and 5, other systems may be utilized as appropriate to the requirements of a specific application in accordance with various embodiments of the invention. Object tracking methods that can be implemented on any of a variety of object tracking system architectures in accordance with a number of embodiments of the invention are discussed further below.

Object Tracking Methods

Figure 4:
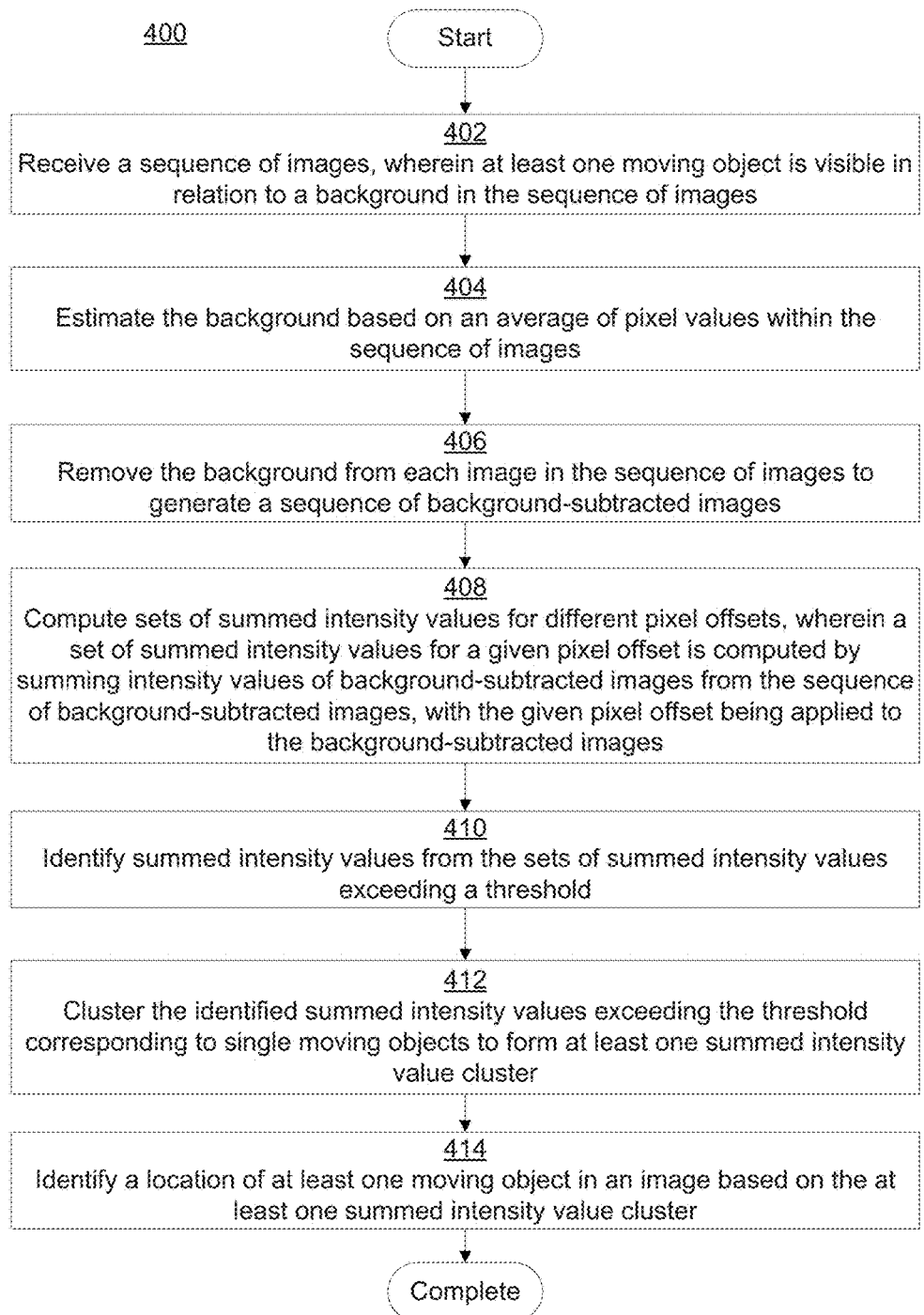
FIG. 4 is a flow chart illustrating an object tracking method according to an embodiment of the invention.
Figure 6:
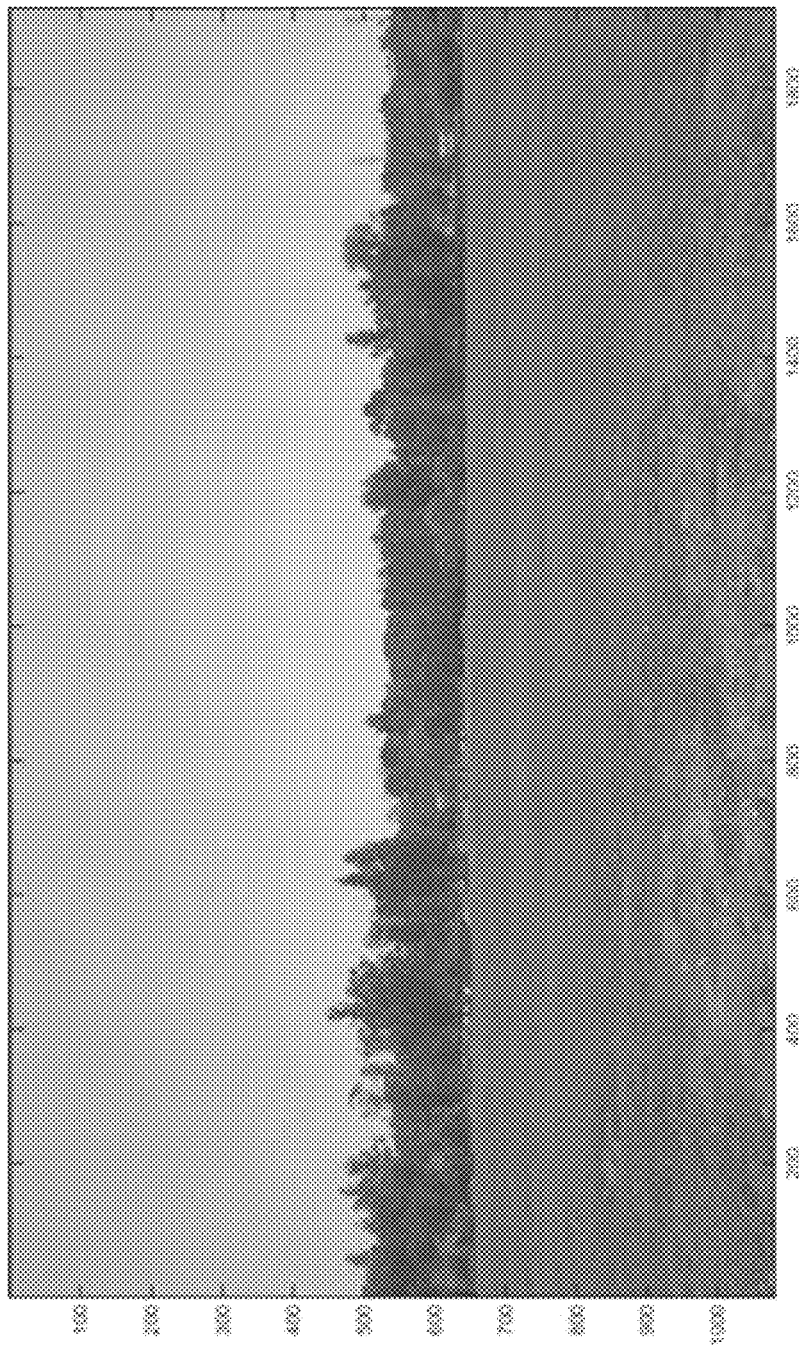
FIG. 6 shows an image in a sequence of images of a scene containing moving objects including a UAV against a background.

A method for performing object tracking in accordance with an embodiment of the invention is shown in FIG. 4. In many embodiments of the invention, a sequence of images is received (402) from one or more cameras. The sequence of images may include consecutive images captured of a scene, and may include at least one moving object in relation to a background in the scene. An example of an image in the sequence of images is shown in FIG. 6.

Figure 7:
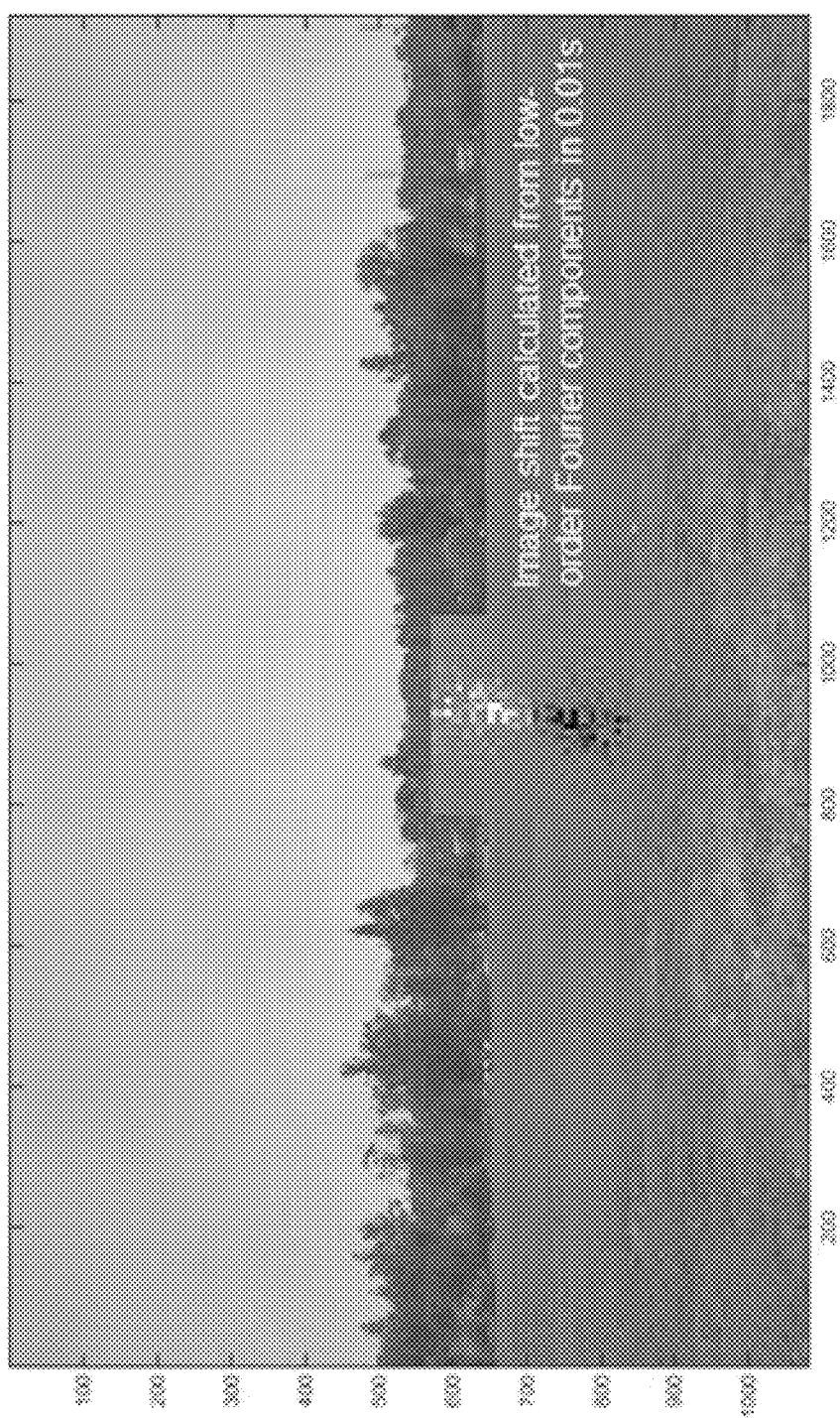
FIG. 7 shows conceptual illustration of a registration alignment shift in an image determined as part of an image stabilization process in accordance with an embodiment of the invention.

In certain embodiments of the invention, image stabilization may optionally be performed on the sequence of images, relative to a reference image within the sequence of images. Image stabilization may reduce camera jitter, and may or may not be appropriate depending on the stability and type of camera that captured the images. As an example, image stabilization may not be necessary where cameras are rigidly mounted in a fixed location. However, even rigidly mounted cameras can experience translations and can benefit from image stabilization. Image stabilization may be performed on the images using a variety of processes, including (but not limited to) Fourier coefficient-based image stabilization. In some embodiments of the invention, only low-order components of a Fourier transform are calculated. FIG. 7 shows a conceptual illustration of a registration alignment or offset calculated from low-order Fourier components in 0.01 s/frame, or specifically, the phase of the low-frequency components of the 2D Fourier transform of a 256×256 pixel patch of the original grayscale image.

According to many embodiments of the invention, a background may be estimated (404) based on an average of pixel values within a sequence of images. Drone detection even against a blue sky may require the subtraction of the background to enhance the detection of the drone, if the contrast of the drone against the sky is low. In particular, when the variation in the background clutter is larger than the contrast of the drone it may be necessary to computationally remove the background before attempting to detect the moving object. In certain embodiments of the invention, image stabilization (i.e., registering the images) is performed to align the images, so as to effectively enable further processes such as background subtraction and shift-and-add calculations, as described below. In the absence of image stabilization, it may not be known which of the raw pixels sample the same portion of the scene. Accordingly, averaging the pixels would not yield information about the background and fixed offsets between frames may not correspond to a constant velocity. Further, in certain embodiments of the invention, image shifts may be measured at several points across the image, and the amount of shift interpolated depending on the location within the image, as optical aberrations in a wide-field camera system can cause the angular magnification to vary across the field of view.

In cases where a camera is panned or tilted, or if the camera is on a moving vehicle, the images shift as they are being recorded. This image motion may often be removed by shifting the image in the computer by a certain integer number of pixels. There are a number of ways to measure the image shift. One approach is to calculate the cross correlation of the two images and look for the peak in the cross correlation.

Figures 7A, 7B, 7C:
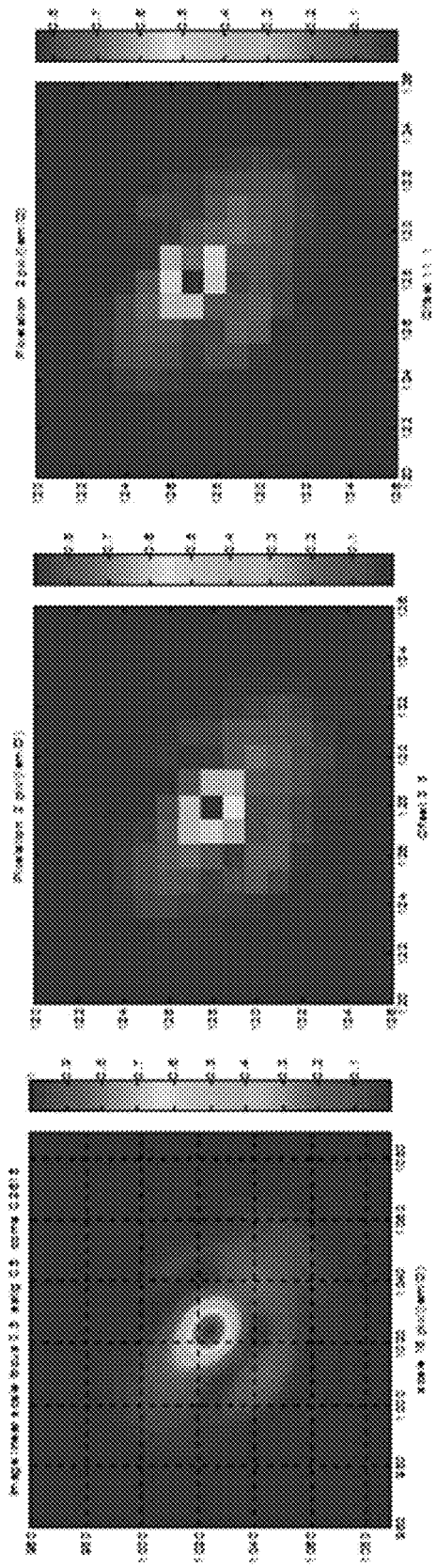
FIG. 7A shows an original image captured by a camera.
FIG. 7B shows a version of the image of FIG. 7A, pixelated at the Nyquist limit.
FIG. 7C shows a version of the image of FIG. 7A pixelated at the Nyquist limit and also shifted by 0.245 pixels.

However, this approach may be imperfect in cases where the image shift does not occur in integer pixel increments. FIG. 7A shows an example of an object in high resolution, and FIGS. 7B-C show that same object pixelated with a fractional pixel shift of 0.245 pixels between FIGS. 7B and 7C. Each of the latter two images cannot be created from the other, if limited to integer pixel shifts.

One approach to this issue according to some embodiments of the invention involves the Shannon sampling theorem, which states that an electrical signal that is band limited, if sampled at or above the Nyquist limit, can perfectly reproduce the original signal. For example, an audio signal limited to 22 Khz, if sampled with an A/D converter at 44 Khz, can reproduce the audio signal even on a 1 microsecond time step. From an information theory point of view, the limited bandwidth of the signal indicates a finite amount of information (per unit time), and when sampled at or above the Nyquist limit, 100% of the information content can theoretically be measured.

According to certain embodiments of the invention, the Shannon sampling theorem may be applied on a spatial function in 2D. In the context of viewing a natural scene, the real world has near infinite information content, in that the scene is the light reflected from a huge number of atoms. But when viewing the scene through a camera or telescope, the angular resolution is limited by the diffraction of light. Diffraction provides a natural bandwidth limit to the spatial frequency content of the image. If the focal plane is Nyquist sampled, or having more than 2 pixels per $\lambda/D$, where $\lambda$ is the highest spatial frequency resolvable by the optics of the camera, and D is the diameter of the primary lens of the camera, the necessary conditions are met for application of Shannon's sampling theorem.

FIGS. 7A-C illustrate such an example. FIG. 7A, the original image, is bandwidth-limited by diffraction. FIG. 7B is a version of the original image pixelated at the Nyquist limit. FIG. 7C is a version of the original image pixelated at the Nyquist limit and also shifted by 0.245 pixels. Using Shannon's theorem it is possible to reconstruct FIG. 7C using FIG. 7B. In many embodiments of the invention, this can be done by first calculating the 2D Fast Fourier Transform (FFT) of the image in the frequency domain, multiplying the result by a 2D linear phase function, and then inverse transforming it back to the spatial domain. The slope in x,y of the linear phase function specifies the magnitude of the image shift, and that slope can represent an arbitrary fractional pixel shift.

In performing image stabilization in a sequence of images, according to many embodiments of the invention, an FFT is performed on each image. This type of processing may be referred to as lossless fractional pixel image interpolation, and may enable near-perfect background clutter subtraction from a camera on a moving platform, whether that platform is a car, truck, plane, drone or satellite.

In certain embodiments of the invention, the image stabilization is performed to calculate the jitter- or motion-induced background offset, which is then added to the shift vector. This implementation may avoid alteration of an image before processing it, and may result in higher efficiency. Further, using merely the phase information from low-order Fourier components of segments of each image may help in the real-time implementation. For example, with GPUs, breaking a large image into small sub-images and using a single shift vector for the sub-image may help reduce the computation time.

For image jitter resulting from certain types of camera motion, such as slow movement, the lossless fractional pixel image interpolation of certain embodiments of the invention described above may be able to fully, or nearly fully, re-register the background, limited by the photon fluctuations in the detected image. However, in cases of large or significant camera jitter from, such as but not limited to, vehicular movement on an unpaved road, the above solution may be insufficient. Large camera jitter may result in smearing of an image within a single frame. When camera jitter is large or fast enough to smear the image in a single frame, the smearing may also be different for different frames.

According to several embodiments of the invention, a mechanical solution to address large camera jitter is to stabilize the camera mechanically, by for example using a 3-axis gimbal. Such gimbals may be mass produced and/or commercially available at reasonable cost, and may be well-suited to mounting ultra-high definition cameras to ground or flying vehicles. The quality of drone video, for example, may be greatly enhanced when the camera is mounted on a servo controlled 3-axis gimbal. The gimbals may alleviate camera jitter sufficiently such that when combined with lossless fractional pixel interpolation, the results may approach that of images captured using a camera fixed to the ground.

In situations where mechanical stabilization of the camera is not available, some embodiments of the invention employ a partial computational solution. This partial solution estimates the camera jitter by reviewing adjacent frames. For example, if a video is taken at 30 hz, within 30 milliseconds the camera is moving in a certain direction. A few frames later, camera jitter may cause the camera to move in a different direction. Based on the direction of the jitter for each frame, each frame can be computationally "degraded" to the same degraded resolution. Then the background should subtract nearly perfectly. This is a partial solution because in the end, the resolution of all the images would be degraded. And while the background clutter can be subtracted properly, the signal-to-noise ratio (SNR) of any moving objects within the frames would also be degraded because of the reduced spatial resolution of the images.

According to many embodiments of the invention, the background may then be removed (406) from each image in a sequence of images to generate a sequence of background-subtracted images. In estimating (404) the background, a number of embodiments of the invention average the image pixels across the sequence of images, resulting in an estimated background independent of the moving object. In several embodiments of the invention, removing (406) this background from the sequence of images removes the pixels of each frame in which a moving object is not present. In certain embodiments of the invention, the background removal process may involve computing a rotated or distorted image as indicated by measurement of the image registration.

Figure 8:
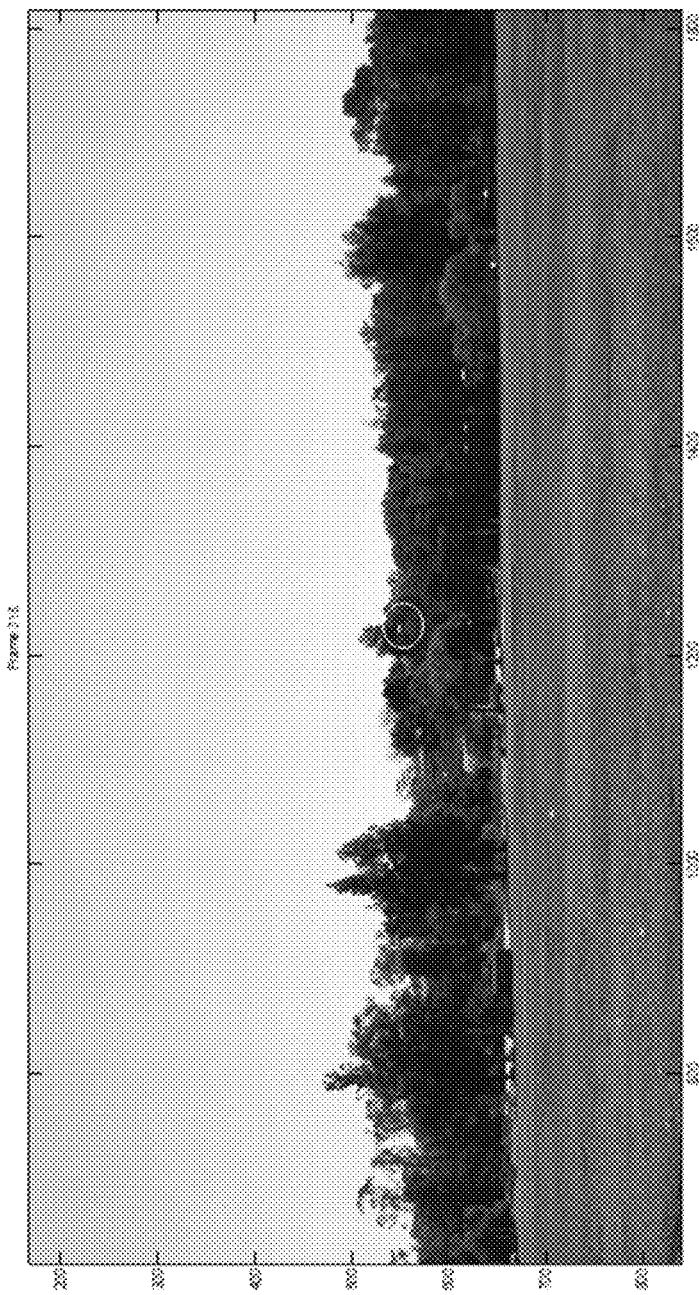
FIG. 8 shows a user interface image with a circled UAV generated in accordance with an embodiment of the invention.
Figure 9:
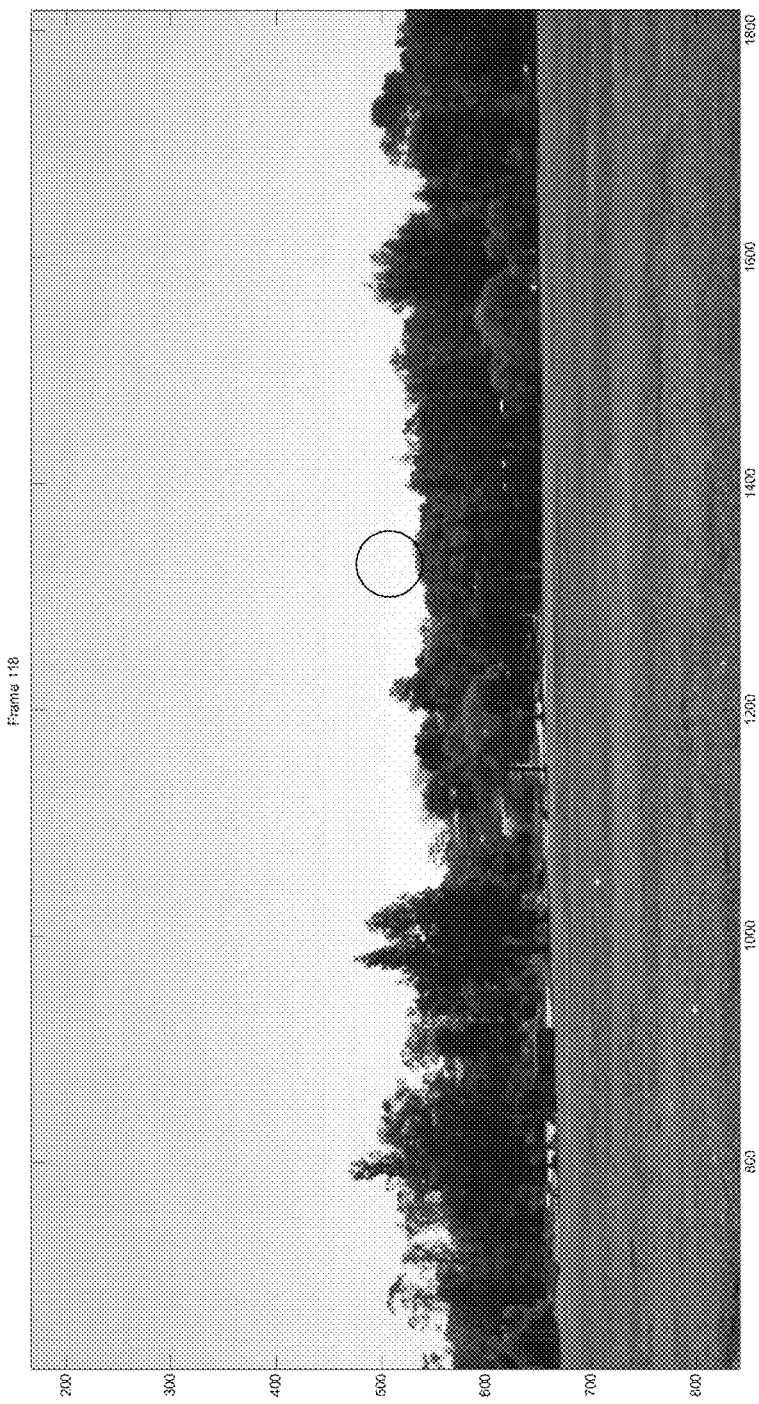
FIG. 9 shows another user interface image with a circled UAV generated in accordance with an embodiment of the invention.
Figure 10:
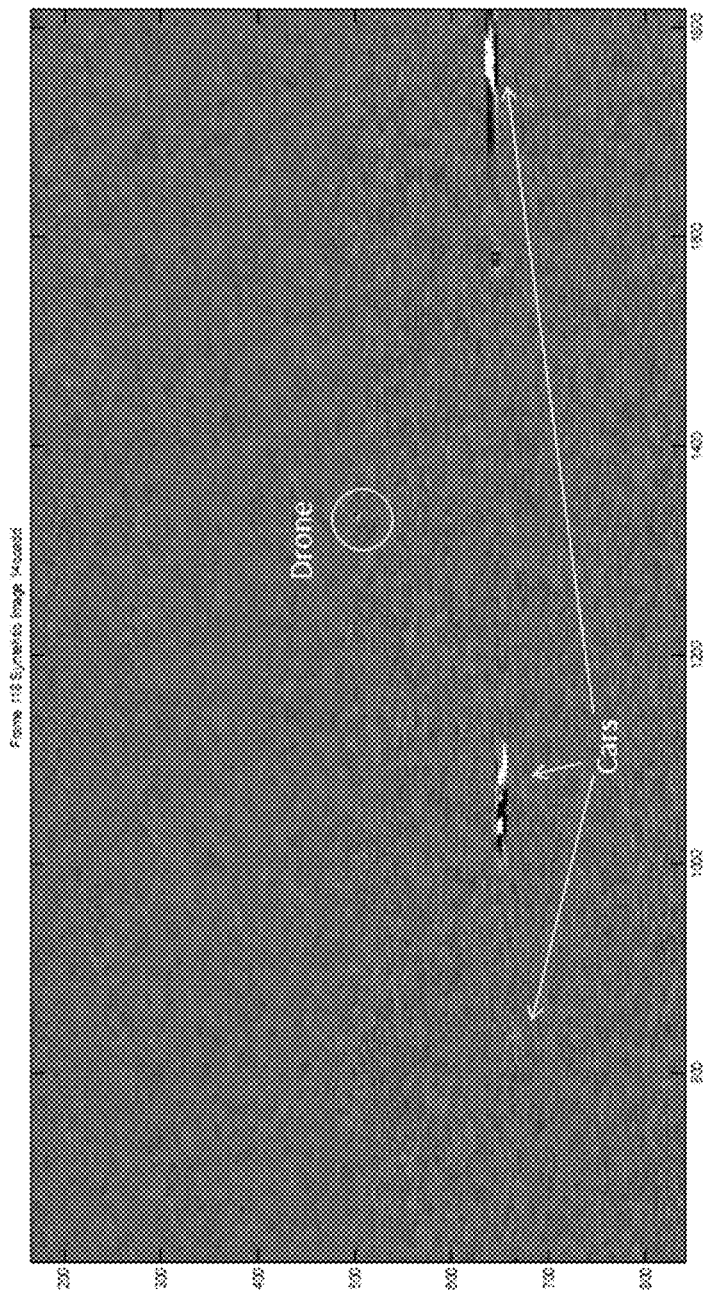
FIG. 10 shows a background-subtracted image generated in accordance with an embodiment of the invention.

While the background subtraction is shown in the flowchart as being performed before the shift-and-add (408) computation, according to certain embodiments of the invention, it could also be performed in conjunction with the shift-and-add process. In the latter case, the background calculations can be performed with respect to only those pixels that are used as inputs to the shift-and-add calculations, thus limiting the background subtraction to pixel locations that are potentially relevant to moving objects. In addition, the same image patches are used to generate intensity sums and pixel background averages. Therefore, these operations can be parallelized within a GPU, which could potentially increase memory access efficiency and/or use less memory. In high-contrast settings such as that shown in FIG. 8, the light-colored UAV circled in the image can be seen against the darker tree background. However, in a low-contrast context such as in FIG. 9 where the circled light-colored UAV is flying directly against the sky, the UAV is not readily identifiable. An example image in which the background has been subtracted is shown in FIG. 10, where the background removal results in an isolation of moving objects within the scene. In this figure, the portions of the image that were substantially stationary have been removed, and the moving cars and UAV remain.

In many embodiments of the invention, a shift-and-add process may be performed upon the sequence of images by computing (408) sets of summed intensity values for different pixel offsets. The pixel offsets may include per frame fixed shifts which, in accordance with some embodiments of the invention, are determined based upon specified and/or assumed velocities of the moving object. Each set of summed intensity values for a given pixel offset, relative to a pixel location in a primary or reference image from the sequence of images, may be computed by applying the given pixel offset to the sequence of images, and then summing the intensity values of those images. Specifically, pixels within the images corresponding to a specified shift per frame are summed. Since the location of moving objects in the images are likely not known a priori, a given pixel within a frame may first be hypothesized to represent a moving object. In certain embodiments of the invention, if image registration indicated a fractional frame shift to compensate for camera motion or image distortion, an interpolation of the values of neighboring pixels can be used instead of a specific pixel value. As an example, in cases of high background clutter, lossless fractional pixel interpolation may be used to suppress the background as completely as possible. In situations where the clutter is less severe, other interpolation techniques may be used. A further assumption may be applied that the object is moving at a given velocity, and a per-frame pixel shift determined based on that velocity. Pixels may then be summed across a sequence of consecutive images based on per-frame shifts in pixel locations between successive frames. Different sums of pixel locations across the sequence of images arise for each of the different per frame shifts corresponding to various possible velocities. When a sum is determined to exceed a threshold value, the presence of a moving object is confirmed and its resulting velocity estimated based on the per frame shift upon which the pixels were summed. When background subtraction is applied to images shifted according to a per frame shift based on the correct velocity, the result reinforces a high contrast pixel value. The sums of values according to per frame shifts based upon incorrectly hypothesized velocities, for pixels that do not image the moving object, will result in a lower sum that is less likely to exceed the threshold.

Figure 11:
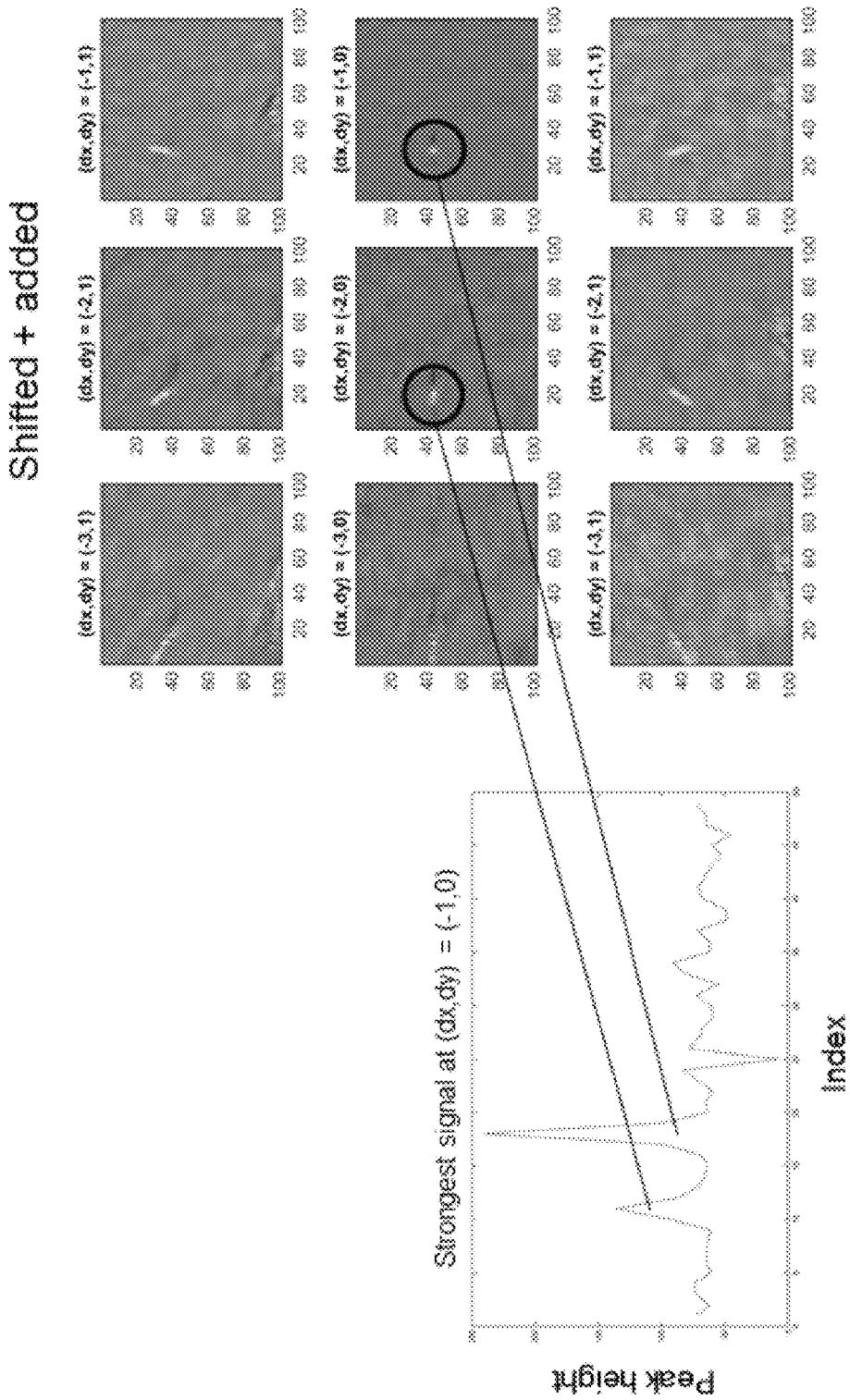
FIG. 11 conceptually illustrates summed intensity values for images and a chart showing locations of peaks in summed intensity values at a given pixel location generated in accordance with an embodiment of the invention.

The result of performing shift-and-add calculations at each pixel location within a region of an image with respect to each of a number of different velocities is conceptually illustrated in FIG. 11. Each image in FIG. 11 corresponds to the summed intensities at a given pixel location, generated using a specific per frame shift relative to the pixel location to select pixels from a sequence of images, and then summing the selected pixels. The images correspond to different per frame integer pixel shifts in the x and/or y direction. While many embodiments simply perform this processing in memory, the images serve to conceptually illustrate the peaks in intensity that occur in the location of a moving object. As can readily be appreciated from the intensity sums generated assuming different per frame shifts, increases in intensity are observed in all images in the location of a moving object. The extent to which the per frame pixel offset corresponds to the velocity vector of the moving object determines the magnitude of the intensity peak. The images that are generated using per frame pixel offsets that most closely approximate the moving object's actual velocity have the highest intensities, and the other images tend to have peaks in intensity that are spread over a larger number of pixels. The direction of the spread in intensity can provide information that is utilized by the process to estimate the actual velocity of the moving object. As is discussed further below, the integer pixel shifts that yield the largest intensity peaks can be utilized to recompute intensity sums by interpolating pixels in the sequence of images corresponding to values at sub-pixel shifts. In this way, the accuracy of the estimated location of the moving object and/or its estimated velocity can be refined.

Since the presence of a moving object causes a change in the intensity of a pixel imaging a moving object in a particular frame is relative to the average or background value of the pixel that is typically observed in the pixel location in the absence of the moving object. When pixel values are summed, those pixels imaging a moving object will appear as high-contrast pixels in relation to the other background-subtracted pixels in the image. According to several embodiments of the invention, summed intensity values from the sets of summed intensity values exceeding a threshold may be identified (410). A location of at least one moving object in the reference image may also be identified based on a summed intensity value from a set of summed intensity values exceeding a threshold. The threshold may be pre-determined and/or fixed. The summed intensity values exceeding a threshold may also be determined adaptively based upon the magnitude of a peak summed intensity value relative to the summed intensity values of surrounding pixel locations Summed intensity values with different per frame pixel offsets are shown in FIG. 11, with the largest peaks obtained for per frame pixel offsets of (dx, dy)=(−1,0) and (dx, dy)=(−2,0).

The high summed intensity values can thus include more than one peak, from which the moving object's position and velocity may be estimated, in accordance with some embodiments of the invention. In certain embodiments of the invention, the position and/or velocity can be refined at a sub-pixel level by determining a sub-pixel shift based on the pixel offsets associated with the plurality of peaks. The sub-pixel shift may be determined by weighting the peak pixel offsets, or by assuming per frame shifts with sub-pixel components. Interpolation can then be used to generate intensity values at the sub-pixel locations. These values can then be summed to generate a summed intensity value for the sub-pixel shift. The result should yield the highest intensity peak, with its value estimating a refined velocity of the moving object.

Figure 12:
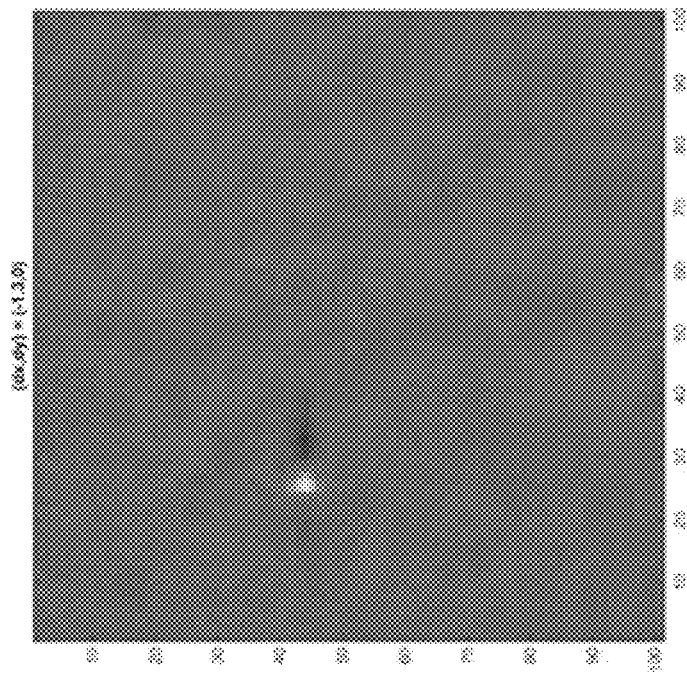
FIG. 12 illustrates summed intensities of interpolated images added based upon a shift incorporating a sub-pixel increment of 1.3 pixels per frame generated in accordance with an embodiment of the invention.
Figure 12:
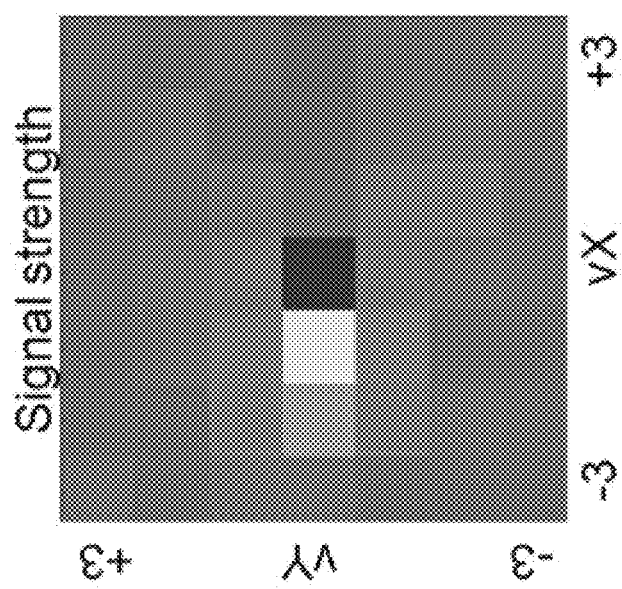

The example in FIG. 12 shows a per frame shift of (−1.3, 0) which is between the two highest peaks of (−1, 0) and (−2, 0). The selection of (−1.3, 0) could be based upon sampling a set of sub-pixel shifts within a range between of (−1, 0) to (−2, 0) or could be determined in a single calculation by determining a sub-pixel shift based upon a weighting of the intensity peaks at (−1, 0) and (−2, 0). A moving object can be determined to exist in the set of images when the absolute value (because the moving object could be darker or brighter than the background) of the highest peak exceeds a threshold value, or when a resampled thumbnail at the interpolated velocity exceeds a threshold value. The threshold value can be determined by an operator or be computed from statistics of the surrounding imagery.

In performing multivector shift-and-add processes, at the correctly hypothesized velocity, the photons may add up to present a bright sharp image of the moving object. However, if the object is bright, a slightly incorrect velocity may still appear as a slightly less bright and/or slightly blurred image, because the velocity is not accurate but still well above the threshold. This may occur for multiple different velocities close to the correct velocity. In order to distinguish between a single object and numerous distinct objects, in several embodiments of the invention, a clustering (412) method according to certain embodiments of the invention may be used, and a location of at least one moving object identified (414) in an image based on a summed intensity value cluster.

In certain embodiments of the invention, the final position and/or velocity of the moving object may be discerned by calculating the multivector shift-and-add on a grid of velocities. This grid may have two parameters, the spacing of velocities as grid points and the extent of the grid. The extent of the grid may be set by the user. As an example and not by way of limitation, a drone moving 100 mph at a distance of 1 mile is moving at an angular rate of 28 milliradians/sec. If the camera has a 1 radian FOV across 2000 pixels (standard HDTV camera) and running at 30 hz, this max motion is 2 pixels/frame. The shift-and-add process may then be performed over the grid of velocities. The real velocity may not be exactly one of these grid points. The spacing of the grid points may be chosen so that at the nearest grid point, the SNR is only degraded by a certain percentage, such as 10~20%.

After the multi-vector shift-and-add process finds a cluster of points in 4D above the detection threshold, the final determination may be made of the best fit position and velocity. The final step may involve testing fraction pixel velocities that results in the most compact synthetic image. This may be performed with a gradient search, which can be quite fast. A standard non-linear least squares fitting routine may be used to find the position and velocity that results in a minimum variance fit to the data.

In the context of imaging moving objects, an object may straddle, for example, two pixels or corners of four pixels, and thus light up multiple pixels. In many applications, it may be useful to perform automatic identification of the objects, as given the enormous volume of video data available with very low cost cameras, it may be infeasible for a human to review each video feed in detail.

In an object tracking process for space debris, as an example, numerous velocities may be examined. Given a multiple-image data set, applying an object tracking application according to an embodiment of the invention to each of the velocities results in a number of synthetic images. As a single bright moving object may result in many above-threshold pixels, the output of the shift-and-add process may produce numerous pixels that are above threshold. At this point, it may be unclear as to whether there exist a significant number of moving objects, a single moving object, or a number in between.

A clustering method in accordance with many embodiments of the invention can sort through the clutter and arrive at the correct number of moving objects in the scene. In a set of input data including multiple images, each image may comprise numerous pixels. The multiple-image input may be considered to be a single data cube as a function of x, y, and time. Likewise, the output of synthetic images corresponding to the velocity vectors may instead be considered to be a single four-dimensional (4D) data cube.

In several embodiments of the invention, the clustering method identifies all above-threshold pixels in the 4D data cube and calculates the 4D distances between those points. When the distance between two pixels in this 4D space represents a neighboring pixel, the two pixels are collected and identified as a single object. In 1D, a pixel has two neighbors. In 2D, every pixel has 8 neighbors; in 3D, 26 neighbors; and in 4D, 80 neighbors. As an example, if the distance between adjacent pixels in 1D is designated to be 1 pixel, then in 2D a corner pixel has a distance of 1.4 pixels from the center pixel. Similarly, in 3D and 4D the corner pixel is 1.7 pixels and 2.0 pixels from the center pixel. When applying the clustering method in 4D, according to certain embodiments of the invention, any two pixels that are 2 or fewer units apart may be clustered. Alternatively, a neighboring pixel can be designated as being 2 pixels distant.

Neighboring pixels may then be combined into object clusters. Thus, for example, if there are 10,000 points above threshold but only 5 distinct objects, the output of the clustering method would be the 5 points that represent the highest summed intensities in each of the 5 object clusters.

According to some embodiments of the invention, a fractional pixel interpolation operation may be used find the final best fit position and velocity after the clustering operation. The output of the clustering method can be sent to a non-linear least squares fitting routine that performs fractional pixel shift-and-add to find the position and velocity of the object. This process may be performed with a precision that is limited no longer by pixelation effects, but only the photon noise in the images.

Figure 13:
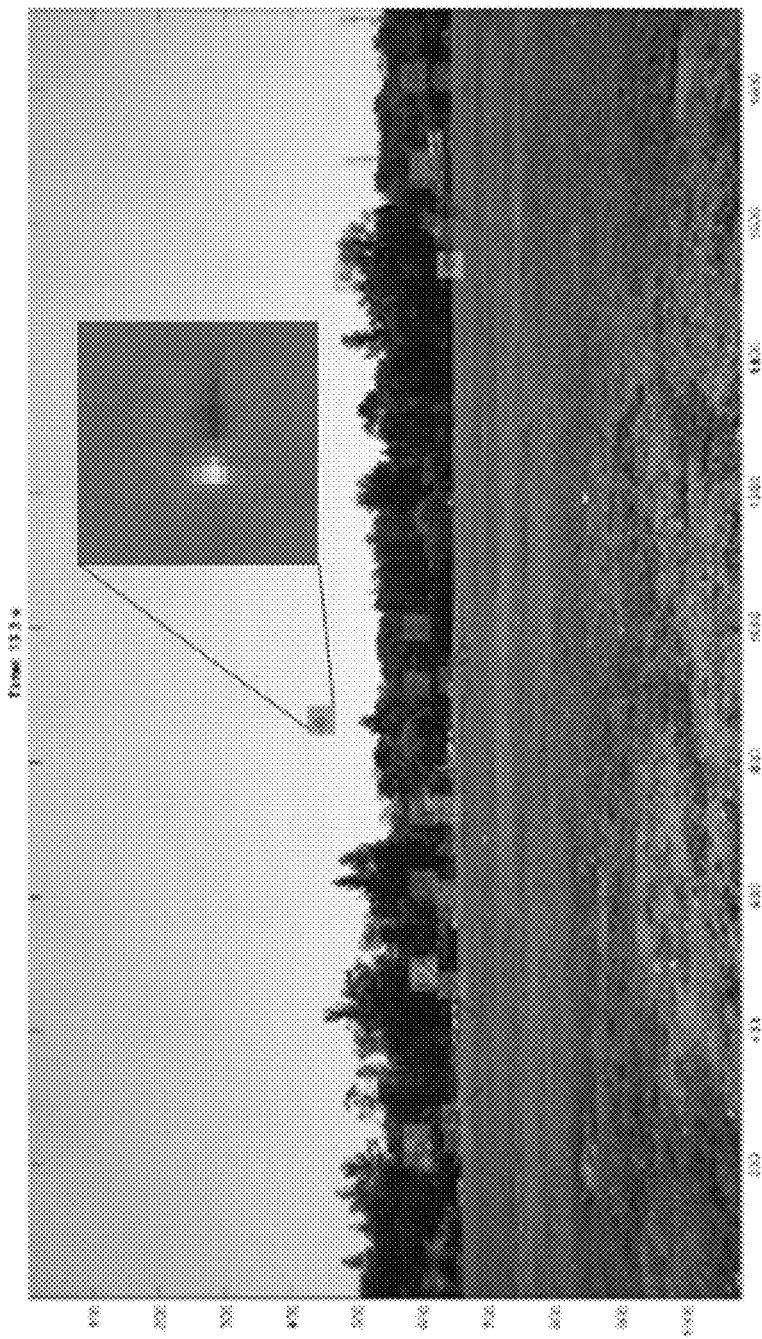
FIG. 13 shows the detection of a drone along with a number of false positives in accordance with an embodiment of the invention.

One phenomenon in the detection of UAV versus the detection of objects in space is illustrated in FIG. 13. After the multishift/add operation, a threshold may be set, above which are considered potential moving objects and below which is considered noise in the background. FIG. 13 shows that the threshold that allows the detection of a drone may also produce a significant number of false positives. The false positives in this example result from trees in the image because their leaves rustle in the wind. The motion of the leaves cause each frame in the video to be slightly different. By chance some of these fluctuations will line up to mimic linear motion over a short period of time. One solution according to some embodiments of the invention comes from realizing that the noise in different parts of the image is different. Instead of setting the threshold at a certain flux level, it may be set at a fixed signal to noise ratio. The area with leaves rustling would have high noise and would need a higher flux level to trigger a claim of detection. The noise level can be measured by comparing the differences in the successive frames of the video.

Further, in certain embodiments of the invention, a thumbnail of the moving object may be generated and displayed or reported to a display device in real time. Some embodiments of the invention may also compute and report the object's size, position and/or velocity. Information regarding the moving object may be reported and/or displayed relative to a reference image. The thumbnail, in combination with other information such as velocity and trajectory, can also be utilized to classify the object as a certain type of object, or into a certain category. Certain embodiments of the invention generate an alert based on the classification of the moving object. The alert may be visual, audio, generated locally and/or transmitted and/or broadcast. Examples of classifications include, but are not limited to, a UAV, asteroid, missile, quadcopter, helicopter, plane, bird, road vehicle, football, Frisbee and other categories of varying specificity.

In certain embodiments of the invention, a "filmstrip", or a series of thumbnails, which could be a time series of original images or resampled thumbnails created by interpolating a subset of the total set of captured images, can be used to assess whether there is a periodicity in the motion, as in the flapping of a bird or the waving of a leaf in the breeze. Successive detections can be used to infer motion over time, where motion over time may be used to identify a class of objects, such as but not limited to footballs following parabolic arcs, rockets traveling in more or less straight lines, waving flags and trees moving back and forth periodically, and/or UAVs and airplanes moving with constant velocity. As an example, the amount of light a flapping bird wing reflects to a camera may vary periodically, so the brightness of the thumbnail image (with background removed) over time can identify periodic motion. Although flapping-bird UAVs exist, a robot bird tends to fly in a straight line while a real bird makes constant course corrections to the path it takes over several seconds. This phenomenon could be used to classify whether the object is a bird or a bird-bot.

Figure 14:
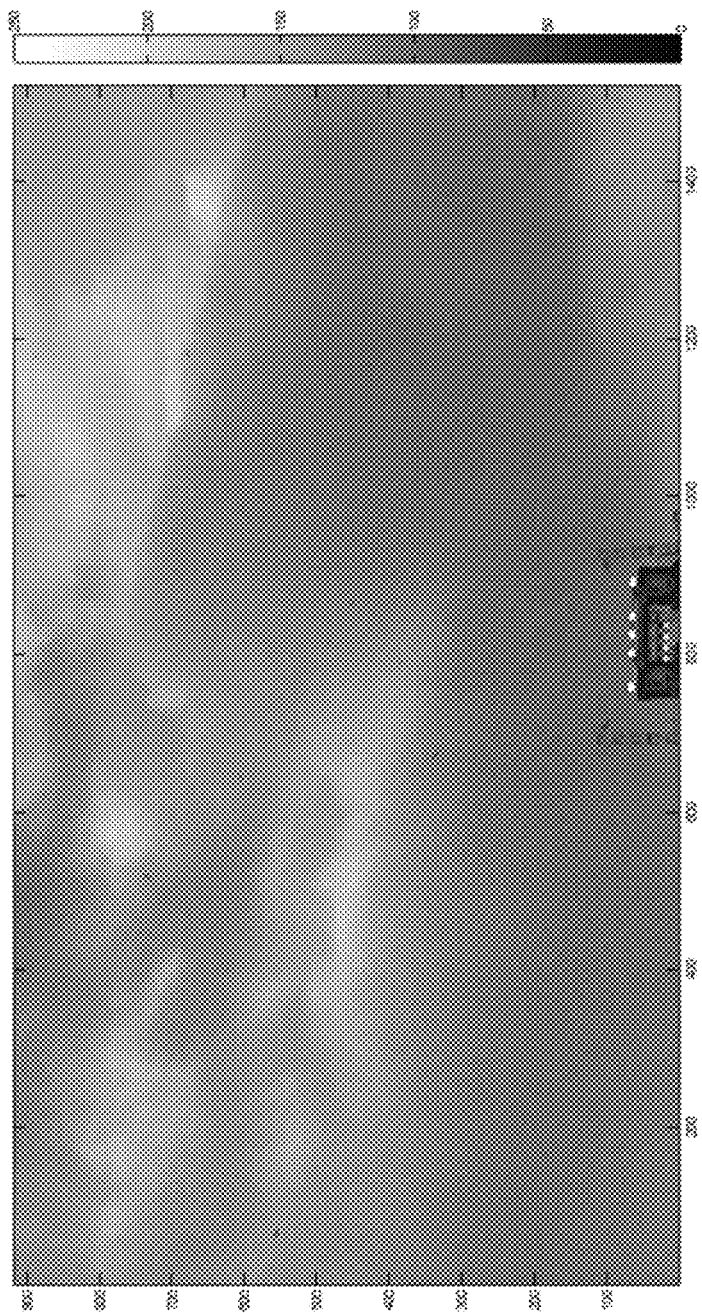
FIG. 14 shows an image of a scene including multiple moving objects against a background.
Figure 15:
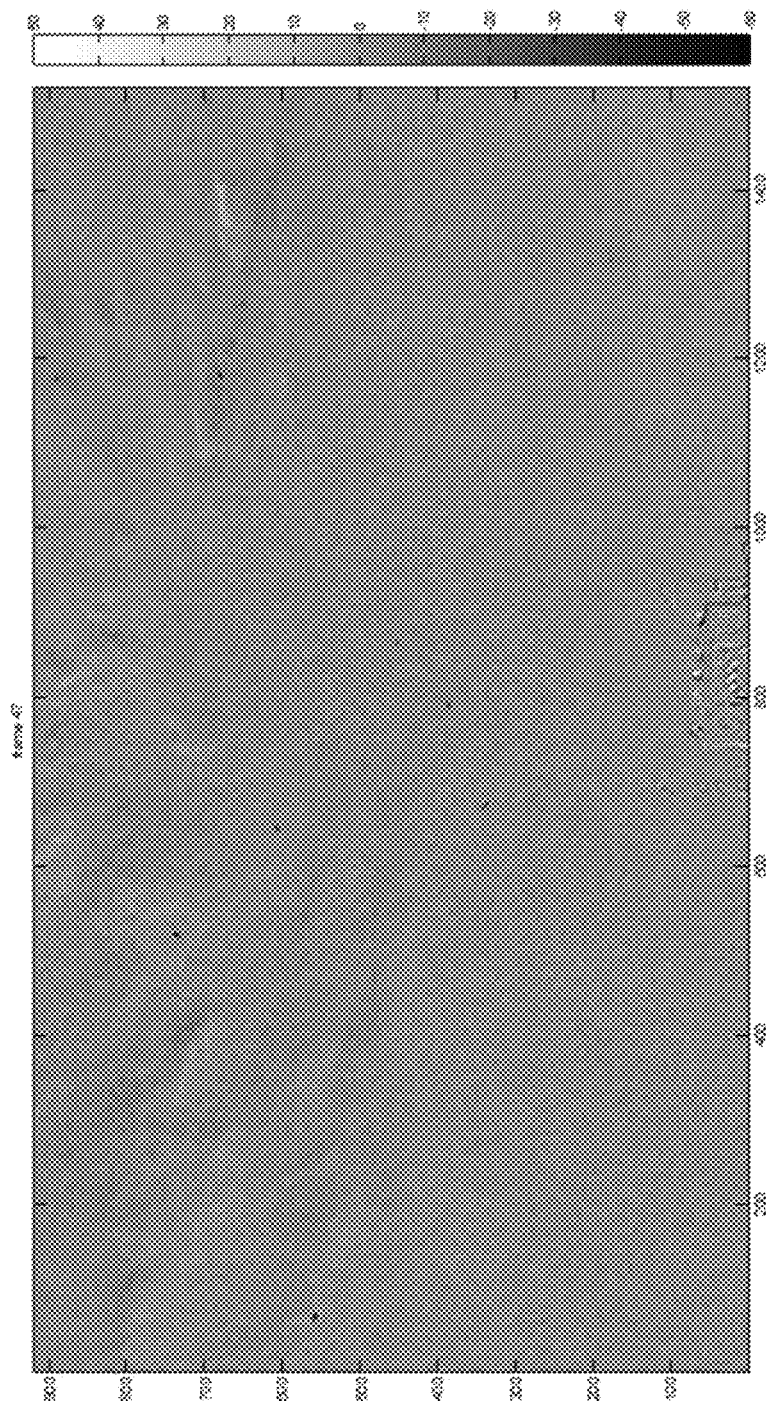
FIG. 15 shows a background-subtracted image with multiple moving objects generated in accordance with an embodiment of the invention.
Figure 16:
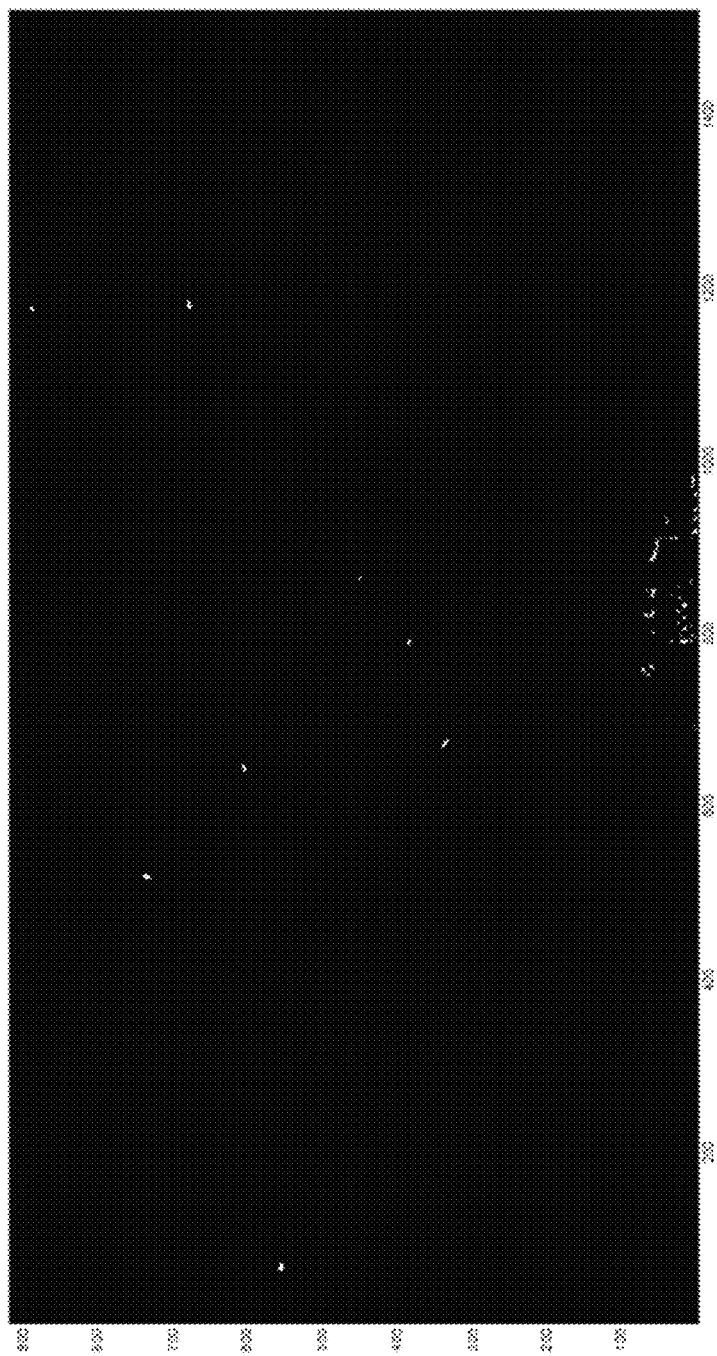
FIG. 16 shows an image showing multiple moving objects generated in accordance with an embodiment of the invention.

A further example of a scene to which object tracking methods are applied according to certain embodiments of the invention is shown in FIGS. 14-16. FIG. 14 shows a frame of multiple moving objects in the sky. FIG. 15 shows the scene with the background mostly subtracted out. After applying a threshold, moving objects identified to be above the threshold are automatically identified as shown in FIG. 16. The moving objects in this image appear as the locations of the intensity summed pixels from a sequence of images that have an intensity sum at a specific per frame pixel offset that exceeds a threshold. According to certain embodiments of the invention, the points of the moving objects shown are potentially moving at different velocities, so the pixel shifts that yielded a sum that is above the threshold at each location may be different.

In accordance with many embodiments of the invention, the processes described above in the present application may be applied in a number of fields and contexts. In many embodiments of the invention, the object tracking can be performed in real time, by employing, for example GPUs and/or parallel processors as discussed in the above section. The real-time reporting of information may provide sufficient time for a relevant response. For example, according to certain embodiments of the invention, an object tracking system may detect and track a UAV indicating a threat, and provide a report and/or alert with sufficient time (e.g., at least ten seconds) to respond. The image and motion analytics provided by the object tracking system, in some embodiments of the invention, may be fed into a threat-assessment pipeline.

While object tracking methods are described above with respect to FIGS. 4-16, other methods may be utilized appropriate to the requirements of a specific application in accordance with various embodiments of the invention. In addition, the processes described above can be performed in different orders as appropriate to the requirements of a specific application, system hardware and other factors. Camera configurations for object tracking in accordance with a number of embodiments of the invention are discussed further below.

Object Tracking Cameras and Configurations

Figure 17:
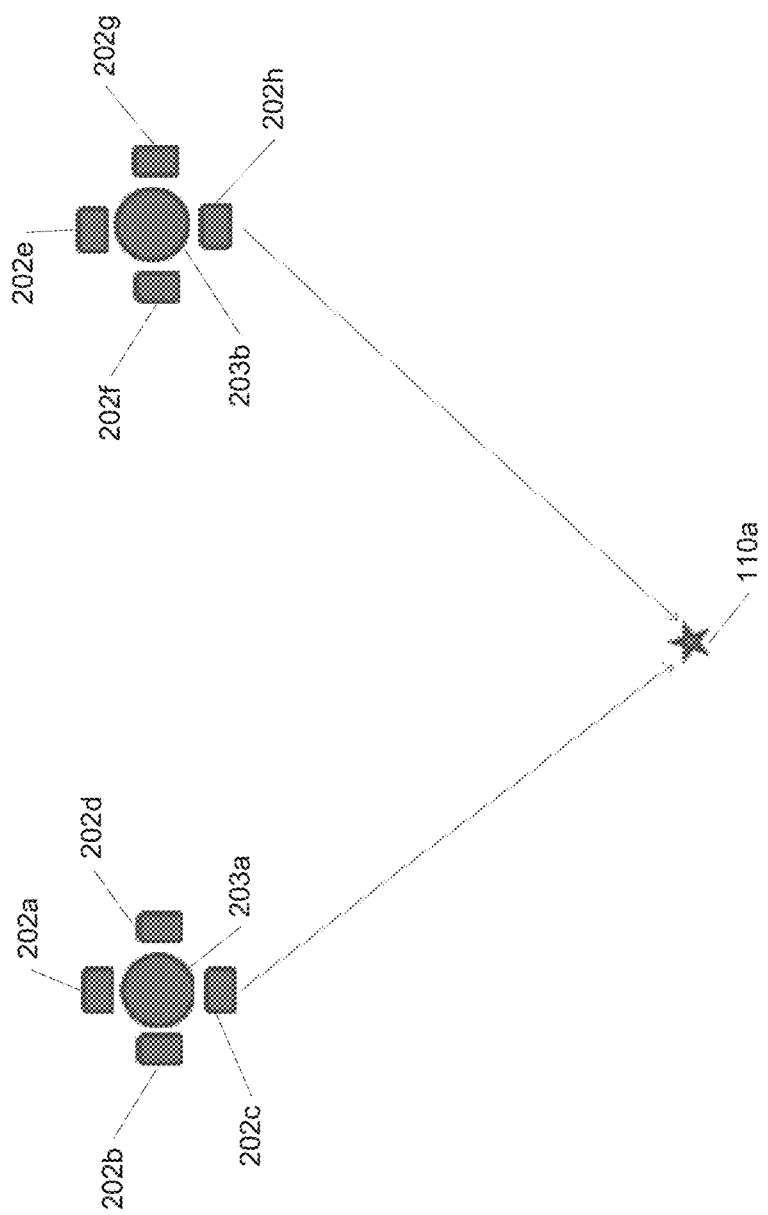
FIG. 17 illustrates one configuration of cameras in an object tracking system in accordance with an embodiment of the invention.

Several embodiments of the invention may employ a plurality of cameras to provide a 4-pi steradians full spherical field of view, 360-degree, or wide coverage of a scene of interest, and/or stereo targeting of a moving object. FIG. 17 illustrates one specific configuration of cameras 202*a-h*, in which four cameras are arranged on each of two poles 203*a-b*. This configuration may enable 360-degree capture of the surrounding area. In addition, since moving object 110*a* may be seen by two or more cameras at separate locations, the captured image data may be used to provide three-dimensional positional and/or velocity vector information of the object. As examples, for drone detection, individual cameras with large fields of view, four cameras may cover 360 degrees. In using space surveillance cameras with smaller fields of view, in certain embodiments of the invention, multiple cameras may be combined to extend the field of view.

Cameras according to embodiments of the invention may be disposed upon vehicles, helmets, and various other devices as appropriate to specific applications. In accordance with some embodiments of the invention, computers implementing object tracking methods may be locally connected to the cameras on each device. Cameras and/or object tracking systems according to certain embodiments of the invention may be arranged to communicate with each other, to provide alerts, analytical coordination, and/or other cooperative functions.

Many embodiments of the invention can be performed in a multiview environment, in which object detections in one field of view can be validated with object detections in another field of view, and in which range can be potentially estimated. Object detections in the field of one camera may also be used to accelerate the search for moving objects in another camera. For example, if a known object exists within the field of view of one camera, a search may be performed along an epipolar line, or within a band around the epipolar line to account for alignment errors and/or errors in the position estimate from the first camera, to look for moving objects. Using epipolar geometry in such a manner, the location of the moving object can be confirmed, as the second viewpoint validates the first viewpoint, and the distance along the epipolar line provides an estimate of the distance of the moving object.

In addition, in certain embodiments of the invention, two velocity vectors may be calculated for the moving object and can be used in conjunction with epipolar geometry to further refine both the distance and the true velocity estimate for the moving object. Specifically, velocity vectors perpendicular to the optical axis of each camera may be determined, and changes in distance over time can yield estimates of velocity in a direction parallel to the optical axis of at least one of the cameras. Given that the differences in the velocity vectors in each viewpoint are related to distance, the two velocity vectors can be used with the depth information to refine both distance and velocity estimates. Further, in many embodiments of the invention, thumbnails generated for the object based on the fields of both cameras may be provided to a classifier to increase the likelihood of correct classification.

While cameras and configurations for object tracking are described above with respect to FIG. 17, it can be readily appreciated that various types, numbers and configurations of cameras may be used in a given object tracking system, as appropriate for the requirements of its specific application in accordance with various embodiments of the invention. Applications of object tracking systems in accordance with a number of embodiments of the invention are discussed further below.

Applications of Object Tracking Systems

The object tracking systems and methods described throughout the present specification may be applied in a number of fields and contexts. In many embodiments of the invention, object tracking can be performed in real time, with information regarding a moving object being reported in sufficient time to allow for a relevant response. For example, according to certain embodiments of the invention, an object tracking system may detect and track an UAV indicating a threat, and provide a report and/or alert with sufficient time (e.g. at least ten seconds) to respond. The image and motion analytics provided by the object tracking system, in some embodiments of the invention, may be fed into a threat-assessment pipeline. In some embodiments of the invention, a recommendation for an appropriate response may be provided, and may involve, for example, the launch of a countermeasure to oppose, neutralize and/or retaliate with regard to the moving object including (but not limited to) launching a projectile, launching a net, and/or launching a counterstrike UAV.

While much of the discussion above is related to detection and tracking of UAVs, systems and methods in accordance with many embodiments of the invention can be utilized to track moving objects in a variety of contexts. The real-time object tracking of several embodiments of the invention can be used in many scientific, medical, commercial, educational, military and other contexts. In the medical field, object tracking systems may be used to identify bacteria in a low-resolution microscope. In certain embodiments of the invention, object tracking can be applied to human blood under a microscope to detect bacteria. High-resolution optics may then be used to determine the type of bacteria and suggest treatment options.

Figure 18:
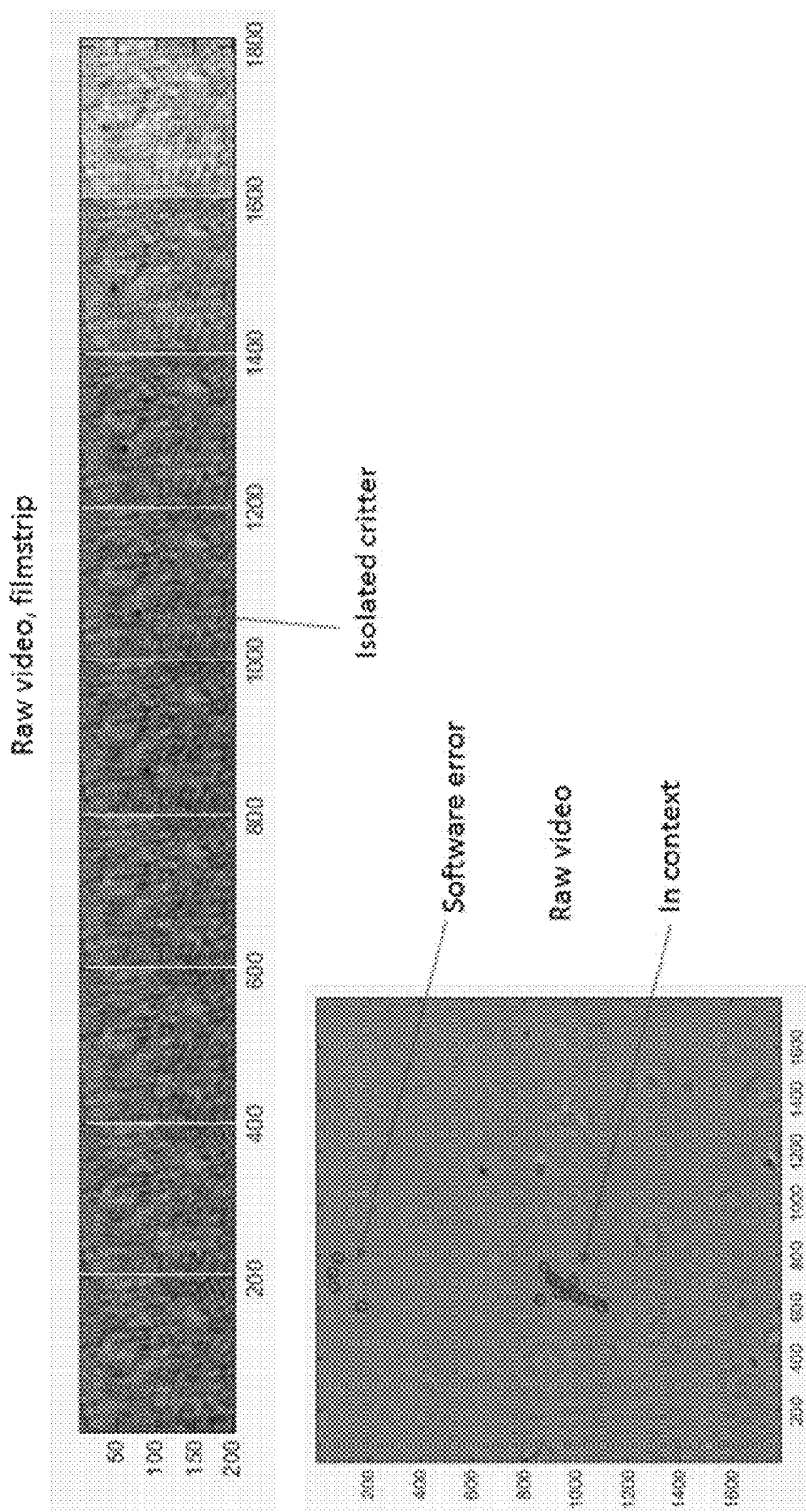
FIGS. 18-19 illustrate microscopic particle motion tracking in accordance with an embodiment of the invention.
Figure 19:
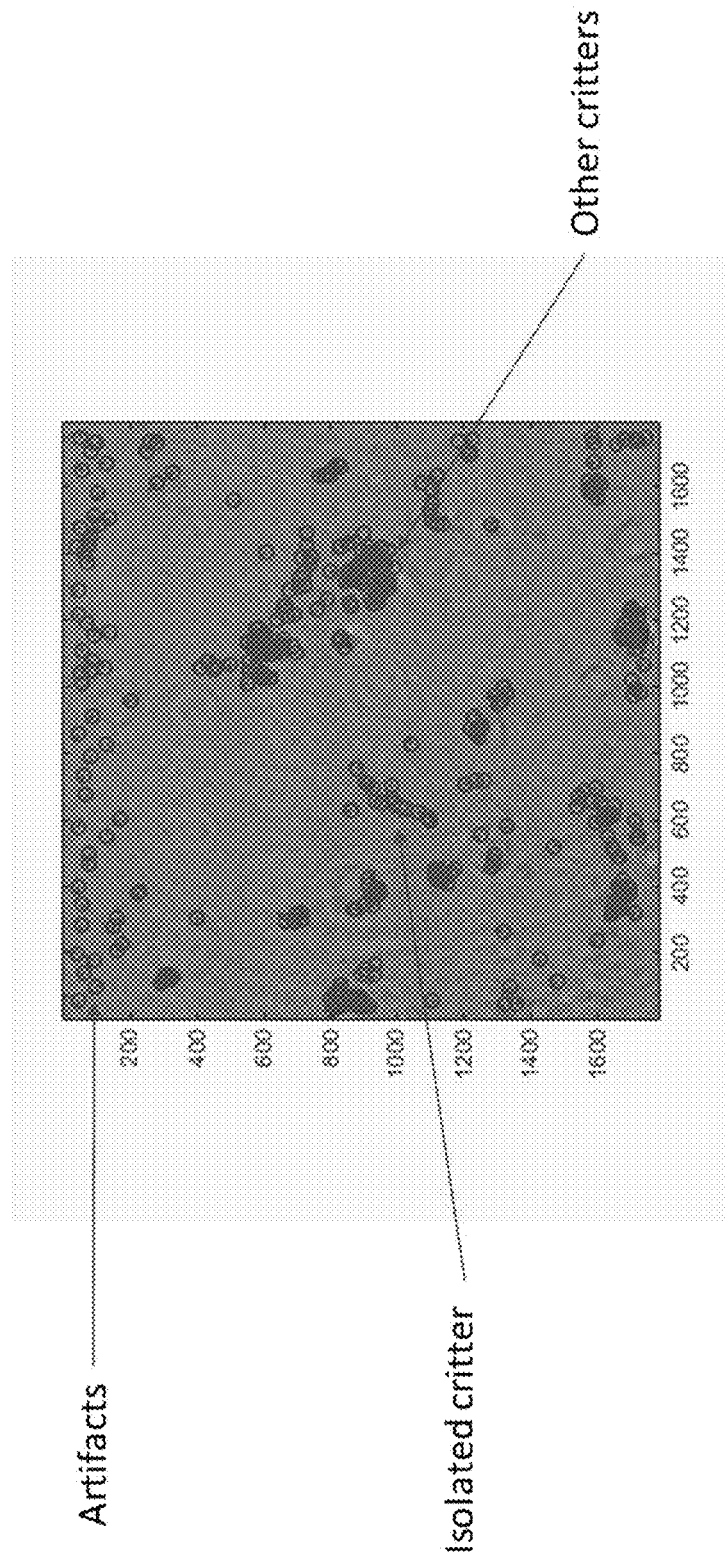

As an example, FIGS. 18-19 illustrate the tracking of particle motion in microbial life from pond water, under a digital holographic microscope. In a low resolution imaging system, the microorganisms may be moving and as a result they are being sampled differently in each consecutive image. According to some embodiments of the invention, an object tracking method may be used to track the microorganisms and crop image patches that contain a single microorganism. The image patches may then be aligned using an image stabilization process. This may generate a series of images of a single organism that sample the organism at slight sub-pixel offsets. This property of sampling a scene with sub-pixel offsets can be exploited to perform super-resolution processing. Super-resolution processes enable synthesis of images that are higher resolution than the images captured by the microscope. This technique could also be utilized in a UAV context, especially in circumstances in which the cameras are fixed.

In some embodiments of the invention, in the holographic microscope, the raw data is first processed into a three-dimensional data cube of pixels (or voxels), and over time the microscope produces a time series of these data cubes. In certain embodiments of the invention, the object tracking methods may be applied to this data set, when the images of the creatures to be detected are larger than a voxel, by slicing the data cubes along one dimension to make a stack of 2D images, combining matching slices from successive data cubes to make a 2D movie, and running the object tracking processes on that. Once the velocity track of a moving object is determined, super-resolution processing entails shifting and adding successive frames, and applying clustering methods such as those described above. Stitching together position and velocities, similarly as that described above with regard to clustering methods, it may be determined, for example, that the long track of circles labeled "In context" near the middle of the raw video of FIG. 18, represents a life form, whereas the "software errors" at the edge are false positives. The software errors may result from noise in the image triggering a detection that looks like a moving object in a single set of frames, but when overlayed on a longer time series, they disappear and reappear possibly without even following a random walk. It may be concluded that they do not actually represent a life form. The motion pattern discrimination in a microscope may be different than for, as an example, a UAV. Glints and image noise typically do not appear to have correlated motion of time, whereas dust in a microscope moves in a random walk because of Brownian motion, and organisms that propel themselves move, at least for some time scale, in relatively straight lines which are statistically highly unlikely to have arisen from a random walk.

This analysis may be performed on a single slice of the data cube, upon two spatial dimensions and one time dimension. However, since the holographic microscope may have 3+1 dimensions (3 spatial and 1 time), the shift and add processes described herein can be extended to search over all velocities in 3 dimensions. This may require about 10 times as much processing power as with 2 dimensions, but it can be parallelized. In some implementations of the microscope, fluid is pumped constantly (and slowly) through the observing area, so the motion jitter may be computed in a subsample of a few image planes, as in the 2D problem, before distributing the imagery to GPUs for processing. Likewise, the thumbnail interpolation and classification processes would all be performed in 3D instead of 2D.

In certain embodiments of the invention, a 3D version of object tracking methods as discussed above may be implemented. A 6D volume may be employed to determine 3D positions and velocities.

Object tracking systems and methods in accordance with many embodiments of the invention may also be applied to detecting objects in space. In detecting objects in space, such as but not limited to satellites or asteroids, it may be important not only to detect them but also to at least roughly measure their orbits. While approximately 1200 new near-Earth asteroids are detected every year, the majority of these are subsequently lost. Orbit measurement is similarly applicable in the monitoring of spacecraft and space debris in Earth's orbit.

When a new moving object in space is detected, a single detection is often insufficient because that observation cannot be linked with prior or subsequent detections of the same object. Object tracking processes in accordance with many embodiments of the invention as described above can be beneficial in tracking space objects, given the measurement of both position and velocity in these processes.

Using a typical 1 m telescope, an asteroid may require an observation period of 20-30 days in order for the orbit to have sufficient precision to enable linking of that set of observations to future detections of the asteroid. Where a detection denotes a single instance where the object is detected, a cataloged observation set denotes a series of observations that allow a crude or estimated orbit to be derived that enables subsequent detections to be linked to this initial orbit. For earth-orbiting satellites near geostationary orbit (GEO) altitude, the required observation period is approximately 2 hrs. However, many asteroids are not detectable over a time span of 20 or 30 days. The asteroid may, for example, move from the nighttime sky to the daytime sky.

Many embodiments of the invention enable much smaller telescopes to detect small, fast moving objects. As an example, 15 cm telescopes used in conjunction with object tracking methods, may render the same sensitivity as 1 m telescopes alone, and lower costs significantly. By itself, the sensitivity of a camera may depend only on the size of its entrance aperture. As an example, the LSST telescope is a facility with an ~8 m telescope, a 3.4 gigpixel focal plane and 9 sqdeg field of view. But the sensitivity of the large aperture may be duplicated with a much smaller telescope that integrates much longer than 15 sec per exposure, when used with object tracking methods in accordance with many embodiments of the invention. This advantage may be considered to arise from the cost scaling for telescopes, with large telescope costs rising significantly. With the use of object tracking methods, similar performance may be obtained using an array of smaller telescopes with the same collecting area. As a particular example, an array of 50 cm telescopes with the same equivalent area would be less expensive than a single large telescope by about a factor of 4.

As applied to asteroid and satellite detection, this lower cost structure can enable a new structure for initial orbit determination. That is, the use of two low cost telescopes separated by some distance, can render a 3D, rather than 2D, measurement of the position of an object in space. Two telescopes viewing the same object in space allow for a parallax (or triangulation) distance measurement. With 3D measurement, an asteroid's orbit can be determined possibly with 2 measurements 2 days apart, in contrast to requiring a series of measurements separated by 20-30 days. A similar concept applies to satellites in Earth's orbit, although on a different timescale.

Figure 20:
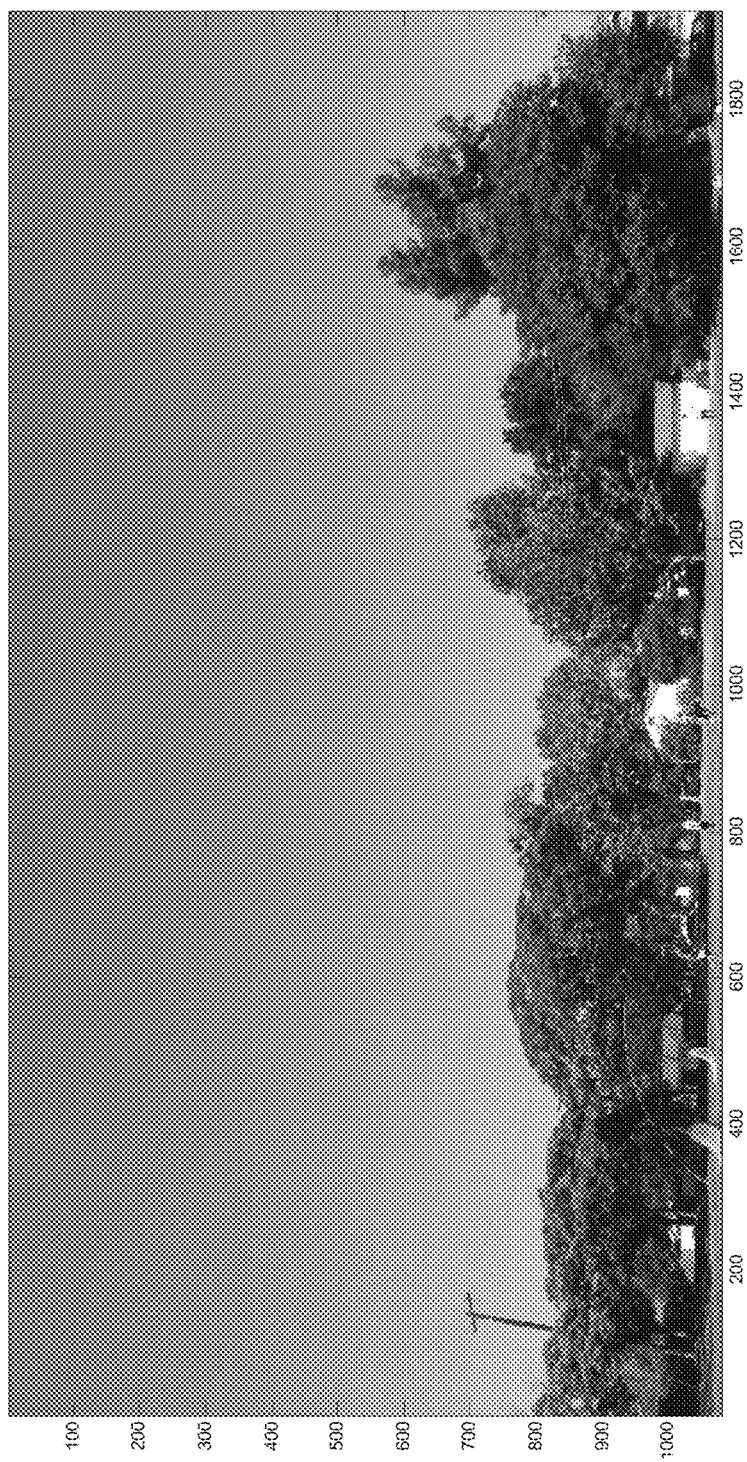
FIGS. 20-24 illustrate another example of an application of object tracking methods according to certain embodiments of the invention.
Figure 21:
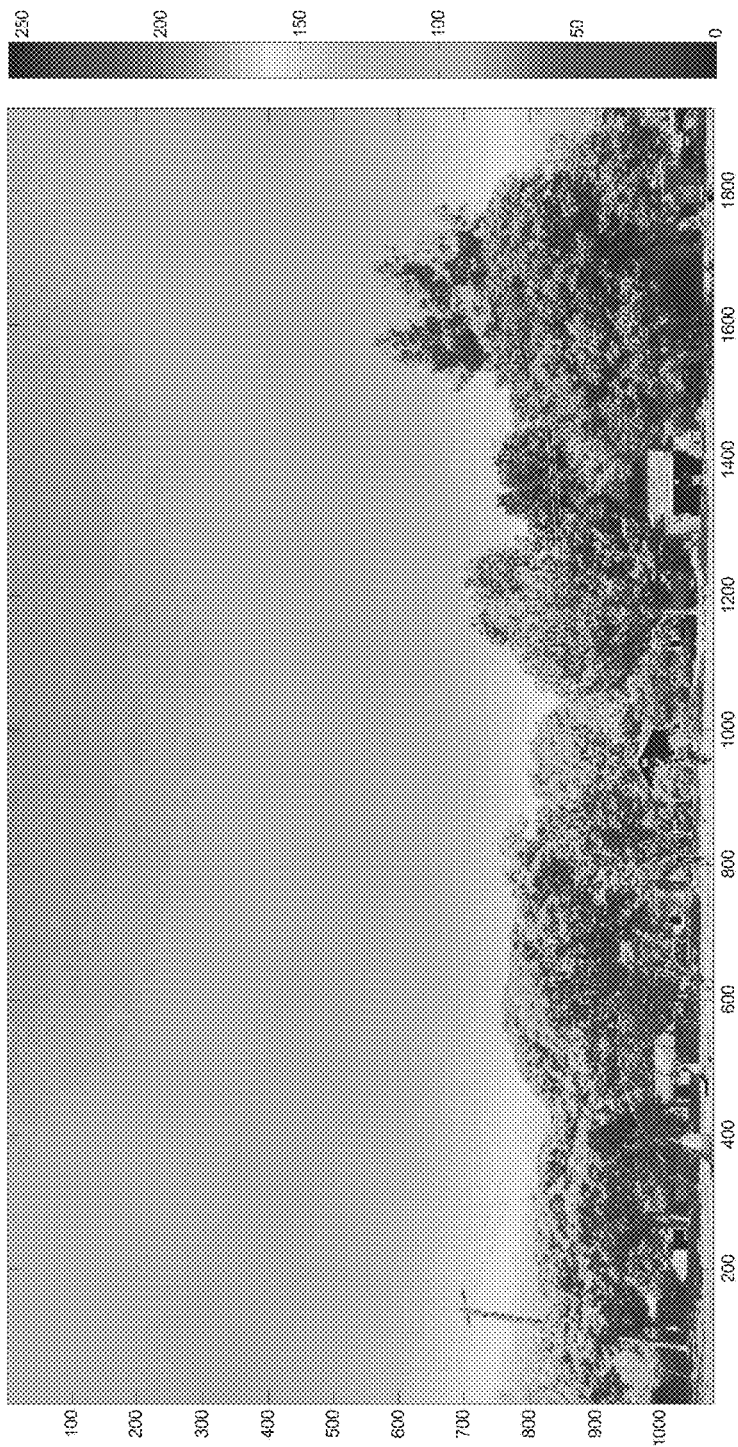
Figure 22:
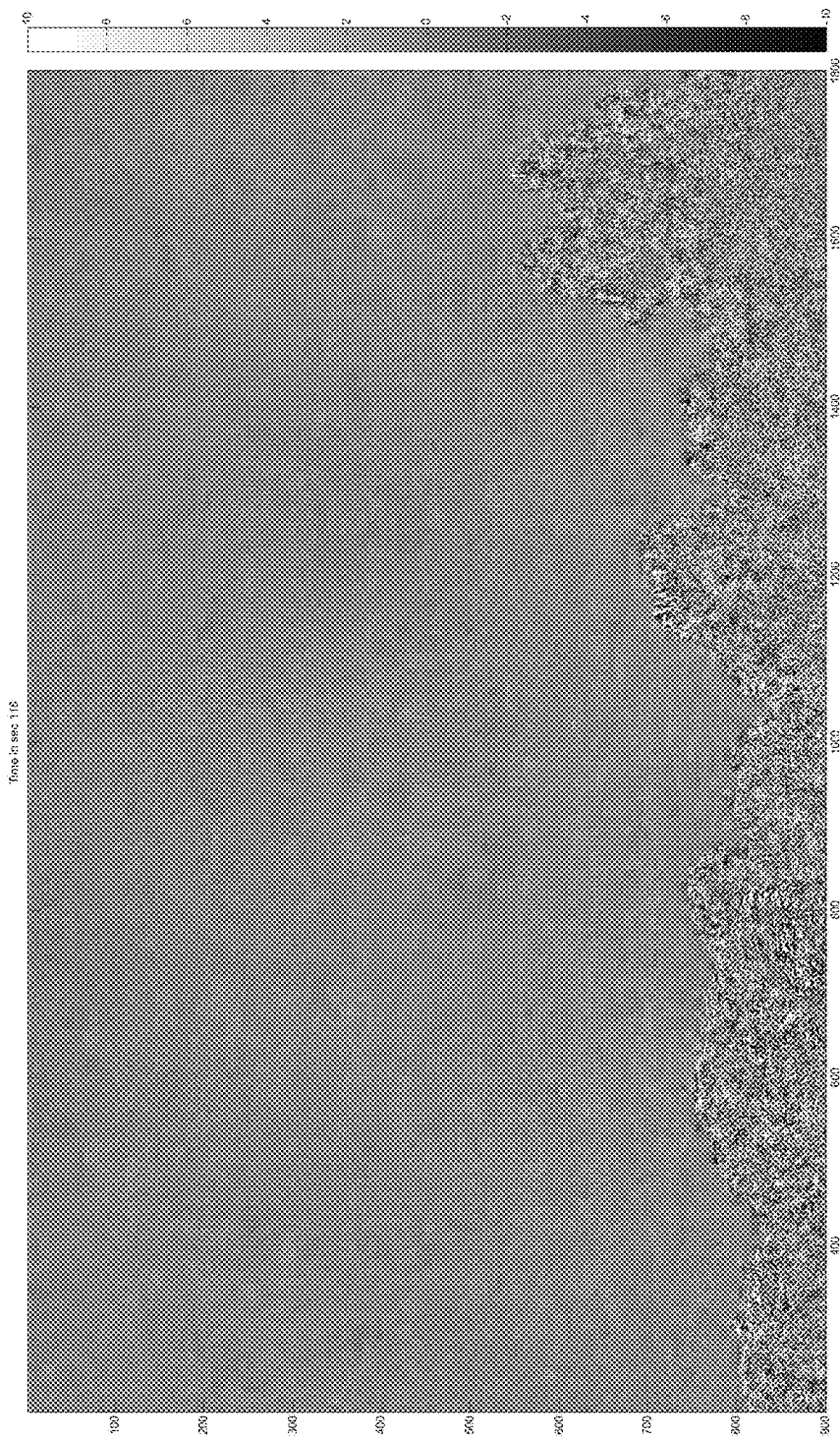
Figure 23:
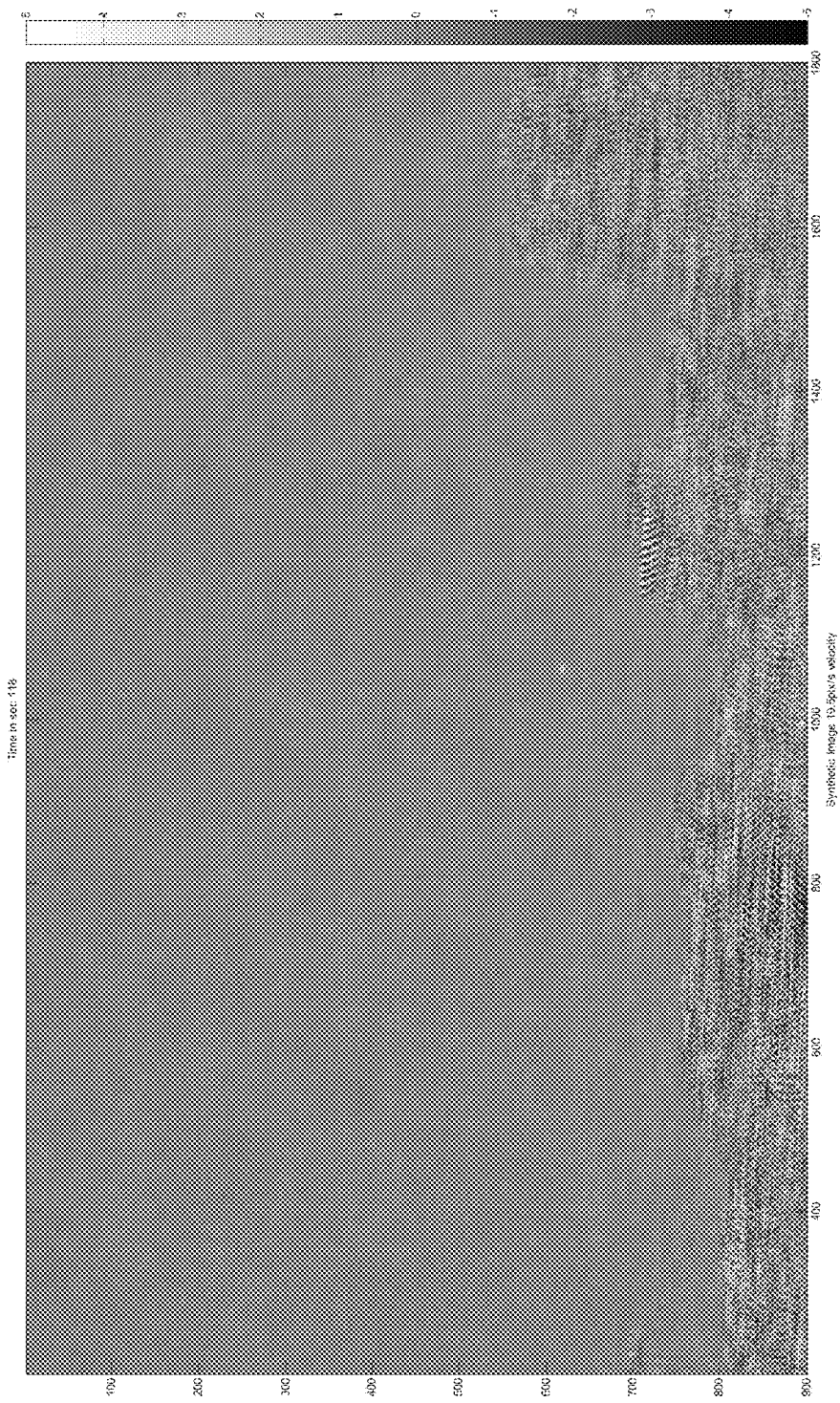
Figure 24:
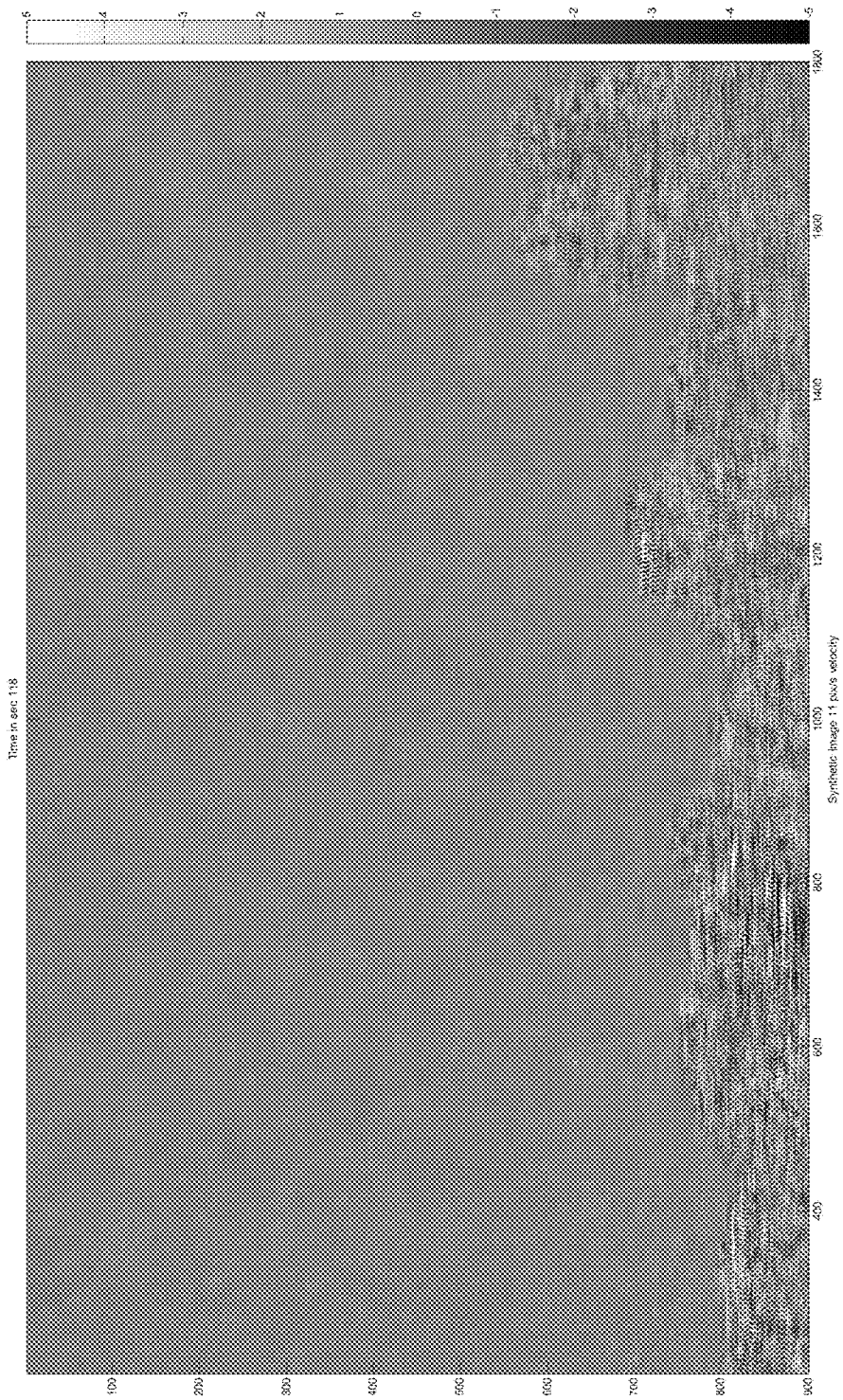

FIGS. 20-24 illustrate another example of an application of object tracking methods according to certain embodiments of the invention. FIG. 20 shows a color image of a scene. FIG. 21 shows the red component of the image of FIG. 20. In certain embodiments of the invention, the red channel may be analyzed for higher contrast because much of the scene is blue because of the sky. FIG. 22 shows the image of FIG. 21 with background clutter removed, but without use of the object tracking methods according to many embodiments of the invention. Here, the trees are not perfectly removed because the leaves are blowing in the wind. In actuality, there were two planes flying left to right above the trees, one moving at ~10 pix/sec and the other at the other ~20 pix/sec. FIG. 23 shows the image of FIG. 21 with application of object tracking methods according to certain embodiments of the invention. Here, one airplane can be seen (flying at ~20 pix/sec). In FIG. 24, object tracking methods are applied to the other plane flying at ~10 pix/sec and behind smog. The flux from the plane is 50 times lower than the sky background.

Although certain embodiments of the invention have been described above with respect to FIGS. 18-24 and other specific applications, it may be contemplated that one or more object tracking systems and methods as discussed above may be utilized in numerous other applications in accordance with various embodiments of the invention.

CONCLUSION

Although the present invention has been described in certain specific aspects, many additional modifications and variations would be apparent to those skilled in the art. It is therefore to be understood that the present invention can be practiced otherwise than specifically described without departing from the scope and spirit of the present invention. Thus, embodiments of the present invention should be considered in all respects as illustrative and not restrictive. Accordingly, the scope of the invention should be determined not by the embodiments illustrated, but by the appended claims and their equivalents.

What is claimed is:

1. An object tracking system, comprising:
   a processor;
   a communications interface capable of transmitting a sequence of images to the processor; and
   a memory coupled with the processor and configured to store an object tracking application, wherein execution of the object tracking application directs the processor to:
   receive a sequence of images, wherein at least one moving object is visible in relation to a background in the sequence of images;
   estimate pixel background values based on an average of pixel values within a sequence of images;
   subtract background pixel values from pixels in a sequence of images;
   compute sets of summed intensity values for different per frame pixel offsets from a sequence of images, wherein a summed intensity value for a given per frame pixel offset is computed by summing intensity values of pixels in the images from the sequence of images determined using the given per frame pixel offset relative to a pixel location in a reference image from the sequence of images;
identify summed intensity values from a set of summed intensity values exceeding a threshold;
cluster the identified summed intensity values exceeding the threshold corresponding to a set of distinct moving objects; and
identify a location of at least one moving object in an image based on at least one summed intensity value cluster.

2. The object tracking system of claim 1, further comprising:
a camera in communication with the processor.

3. The object tracking system of claim 1, further comprising:
a plurality of cameras in communication with the processor.

4. The object tracking system of claim 1, wherein execution of the object tracking application further directs the processor to:
perform image stabilization on a sequence of images.

5. The object tracking system of claim 4, wherein the image stabilization is performed by:
calculating a Fourier transform for each image in the sequence of images in the frequency domain; and
multiplying each of the Fourier transforms by a linear phase function, wherein the slope of the linear phase function specifies a fractional pixel shift.

6. The object tracking system of claim 5, wherein the image stabilization is further performed by:
inverse transforming each of the Fourier transforms back to the spatial domain.

7. The object tracking system of claim 5, wherein the given per frame pixel offset is determined based on the fractional pixel shift and a velocity shift.

8. The object tracking system of claim 4, wherein the image stabilization is performed by:
identifying at least one camera movement direction based on a set of adjacent frames of the sequence of images; and
degrading the resolution of each frame of the set of adjacent frames based on the at least one camera movement direction.

9. The object tracking system of claim 1, wherein summing intensity values of pixels from the sequence of images determined using the given per frame pixel offset relative to a pixel location in the reference image is performed by:
creating background-subtracted pixels; and
summing intensity values of the background-subtracted pixels from the sequence of images determined using the given per frame pixel offset relative to a pixel location in the reference image.

10. The object tracking system of claim 1, wherein summing intensity values of pixels from the sequence of images determined using the given per frame pixel offset relative to a pixel location in the reference image is performed by:
summing the intensity values of the pixels for the given per frame pixel offset; and
subtracting the background pixel values for the summed pixels from the sum of the intensity values of the pixels.

11. The object tracking system of claim 1, wherein execution of the object tracking application further directs the processor to:
determine at least one peak in the at least one summed intensity value exceeding a threshold;
detect a position of the at least one moving object based on the at least one peak; and
report the position of the at least one moving object to a display device in real time.

12. The object tracking system of claim 11, wherein:
the at least one peak includes a plurality of peaks; and
execution of the object tracking application further directs the processor to:
determine a per frame sub-pixel offset based on the pixel offsets associated with the plurality of peaks;
compute a summed intensity value for the per frame sub-pixel offset by:
interpolating a plurality of intensity values for the per frame sub-pixel offset, the plurality of interpolated intensity values including an interpolated intensity value for a plurality of images in the sequence of images; and
summing at least the plurality of interpolated intensity values to generate the summed intensity value;
estimate a velocity of the at least one moving object based on the per frame sub-pixel offset associated with the summed intensity value;
and
report the velocity of the at least one moving object to a display device in real time.

13. The object tracking system of claim 1, wherein clustering the identified summed intensity values exceeding the threshold corresponding to a set of distinct moving objects is performed by:
calculating a distance between a first summed intensity value and a second summed intensity value in four-dimensional space, the first and second summed intensity values being from identified summed intensity values exceeding the threshold;
determining whether the first and second summed intensity values are neighbors based on the calculated distance; and
when the first and second summed intensity values are determined to be neighbors, combining the first and second summed intensity values into a summed intensity value cluster.

14. The object tracking system of claim 1, wherein execution of the object tracking application further directs the processor to display the location of the at least one moving object in an image from a received sequence of images in real time.

15. The object tracking system of claim 1, wherein execution of the object tracking application further directs the processor to classify the at least one moving object into an object category.

16. The object tracking system of claim 1, wherein execution of the object tracking application further directs the processor to generate an alert based on classification of the at least one moving object into an object category.

17. The object tracking system of claim 1, wherein execution of the object tracking application further directs the processor to:
generate a thumbnail of at least one moving object; and
report a thumbnail of at least one moving object via a display device in real time.

18. The object tracking system of claim 1, wherein the at least one moving object includes an article from the group consisting of an asteroid and an unmanned aerial vehicle (UAV).

19. An object tracking method, comprising:
receiving a sequence of images, wherein at least one moving object is visible in relation to a background in the sequence of images;
estimating pixel background values based on an average of pixel values within the sequence of images;
subtracting the background pixel values from pixels in the sequence of images to create background-subtracted pixels;
computing sets of summed intensity values for different per frame pixel offsets from the background-subtracted pixels, wherein a summed intensity value for a given per frame pixel offset is computed by summing intensity values of background-subtracted pixels from the sequence of images determined using the given per frame pixel offset relative to a pixel location in a reference image from the sequence of images;
identifying summed intensity values from the sets of summed intensity values exceeding a threshold;
clustering the identified summed intensity values exceeding the threshold corresponding to a set of distinct moving objects to form at least one summed intensity value cluster; and
identifying a location of at least one moving object in an image based on the at least one summed intensity value cluster.

20. The object tracking method of claim 19, further comprising:
performing image stabilization on the sequence of images.

21. The object tracking method of claim 20, wherein the image stabilization is performed by:
calculating a Fourier transform for each image in the sequence of images in the frequency domain; and
multiplying each of the Fourier transforms by a linear phase function, wherein the slope of the linear phase function specifies a fractional pixel shift.

22. The object tracking method of claim 21, wherein the image stabilization is further performed by:
inverse transforming each of the Fourier transforms back to the spatial domain.

23. The object tracking method of claim 21, wherein the given per frame pixel offset is determined based on the fractional pixel shift and a velocity shift.

24. The object tracking method of claim 20, wherein the image stabilization is performed by:
identifying at least one camera movement direction based on a set of adjacent frames of the sequence of images; and
degrading the resolution of each frame of the set of adjacent frames based on the at least one camera movement direction.

25. The object tracking method of claim 19, further comprising:
determining at least one peak in the at least one summed intensity value exceeding a threshold;
detecting a position of the at least one moving object based on the at least one peak; and
reporting the position of the at least one moving object to a display device in real time.

26. The object tracking method of claim 25, wherein:
the at least one peak includes a plurality of peaks; and
the method further comprises:
determining a per frame sub-pixel offset based on the pixel offsets associated with the plurality of peaks;
computing a summed intensity value for the per frame sub-pixel offset by:
interpolating a plurality of intensity values for the per frame sub-pixel offset, the plurality of interpolated intensity values including an interpolated intensity value for a plurality of images in the sequence of images; and
summing at least the plurality of interpolated intensity values to generate the summed intensity value;
estimating a velocity of the at least one moving object based on the per frame sub-pixel offset associated with the summed intensity value;
and
reporting the velocity of the at least one moving object to a display device in real time.

27. The object tracking method of claim 19, wherein clustering identified summed intensity values exceeding the threshold corresponding to a set of distinct moving objects is performed by:
calculating a distance between a first summed intensity value and a second summed intensity value in four-dimensional space, the first and second summed intensity values being from identified summed intensity values exceeding the threshold;
determining whether the first and second summed intensity values are neighbors based on the calculated distance; and
when the first and second summed intensity values are determined to be neighbors, combining the first and second summed intensity values into a summed intensity value cluster.

28. The object tracking method of claim 19, further comprising:
displaying the location of the at least one moving object in an image from a received sequence of images in real time.

29. The object tracking method of claim 19, further comprising:
classifying the at least one moving object into an object category.

30. The object tracking method of claim 29, further comprising:
generating an alert based on the classification of the at least one moving object into the object category.

31. The object tracking method of claim 19, further comprising:
generating a thumbnail of the at least one moving object; and
reporting the thumbnail of the at least one moving object to a display device in real time.

32. The object tracking method of claim 19, wherein the at least one moving object includes an article from the group consisting of an asteroid and an unmanned aerial vehicle (UAV).

33. An object tracking system, comprising:
a processor;
a communications interface capable of transmitting a sequence of images to the processor; and
a memory coupled with the processor and configured to store an object tracking application, wherein execution of the object tracking application directs the processor to:
receive a sequence of images, wherein at least one moving object is visible in relation to a background in the sequence of images;

perform image stabilization relative to a reference image in the sequence of images;
estimate pixel background values based on an average of pixel values within the image stabilized sequence of images;
subtract the background pixel values from pixels in the image stabilized sequence of images to create background-subtracted pixels;
compute sets of summed intensity values for different per frame pixel offsets from the background-subtracted pixels, wherein a summed intensity value for a given per frame pixel offset is computed by summing intensity values of the background-subtracted pixels from the image stabilized sequence of images determined using the given per frame pixel offset relative to a pixel location in the reference image;
identify summed intensity values from the sets of summed intensity values exceeding a threshold;
cluster the identified summed intensity values exceeding the threshold corresponding to a set of distinct moving objects to form at least one summed intensity value cluster; and
identify a location of at least one moving object in the reference image based on the at least one summed intensity value cluster.

\* \* \* \* \*